United States Patent
Suetsuna et al.

(10) Patent No.: US 10,090,088 B2
(45) Date of Patent: *Oct. 2, 2018

(54) SOFT MAGNETIC MATERIAL, ROTATING ELECTRIC MACHINE, MOTOR, AND GENERATOR

(71) Applicant: Kabushiki Kaisha Toshiba, Minato-ku (JP)

(72) Inventors: Tomohiro Suetsuna, Kawasaki (JP); Tomoko Eguchi, Yokohama (JP); Kouichi Harada, Bunkyo (JP); Seiichi Suenaga, Yokohama (JP); Hiroaki Kinouchi, Shinagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/259,391

(22) Filed: Sep. 8, 2016

(65) Prior Publication Data
US 2017/0076845 A1    Mar. 16, 2017

(30) Foreign Application Priority Data

Sep. 14, 2015 (JP) .................. 2015-181271
Jul. 4, 2016 (JP) .................. 2016-132906

(51) Int. Cl.
*H01F 1/14* (2006.01)
*H01F 1/147* (2006.01)
(Continued)

(52) U.S. Cl.
CPC .......... *H01F 1/14741* (2013.01); *H01F 1/28* (2013.01); *H01F 3/08* (2013.01); *H02K 1/02* (2013.01); *H02K 1/146* (2013.01); *H02K 1/22* (2013.01)

(58) Field of Classification Search
None
See application file for complete search history.

(56) References Cited

U.S. PATENT DOCUMENTS 5,651,841 A * 7/1997 Moro ............. H01F 1/24
148/309
6,310,837 B1 * 10/2001 Chou ............ G06K 19/06196
369/13.38

(Continued)

FOREIGN PATENT DOCUMENTS

JP    10-92621      4/1998
JP    2002-256304   9/2002
(Continued)

OTHER PUBLICATIONS

U.S. Appl. No. 15/259,371, filed Sep. 8, 2016, Tomohiro Suetsuna, et al.

*Primary Examiner* — Kevin M Bernatz
(74) *Attorney, Agent, or Firm* — Oblon, McClelland, Maier & Neustadt, L.L.P.

(57) ABSTRACT

The soft magnetic material of embodiments includes flattened magnetic metal particles including at least one magnetic metal selected from iron (Fe), cobalt (Co) and nickel (Ni), each of the flattened magnetic metal particles having a thickness of from 10 nm to 100 μm, an aspect ratio of from 5 to 10,000, and a lattice strain of from 0.01% to 10%, and being oriented with magnetic anisotropy in one direction within aligned flattened surface; and an interposed phase existing between the flattened magnetic metal particles and including at least one of oxygen (O), carbon (C), nitrogen (N) and fluorine (F).

20 Claims, 13 Drawing Sheets

(51) Int. Cl.
*H02K 1/14* (2006.01)
*H02K 1/22* (2006.01)
*H01F 1/28* (2006.01)
*H01F 3/08* (2006.01)
*H02K 1/02* (2006.01)

(56) References Cited

U.S. PATENT DOCUMENTS

| | | | |
|---|---|---|---|
| 2010/0060538 A1 | 3/2010 | Suetsuna et al. | |
| 2011/0217543 A1* | 9/2011 | Suetsuna | B32B 5/16 428/323 |
| 2011/0240909 A1* | 10/2011 | Kanda | H01F 1/0555 252/62.55 |
| 2013/0228716 A1* | 9/2013 | Suetsuna | B22F 1/02 252/62.55 |
| 2014/0097377 A1* | 4/2014 | Igarashi | H01F 1/15383 252/62.54 |
| 2017/0209924 A1* | 7/2017 | Suetsuna | B22F 1/0055 |

FOREIGN PATENT DOCUMENTS

| | | |
|---|---|---|
| JP | 2003-45708 | 2/2003 |
| JP | 2006-80166 | 3/2006 |
| JP | 2006-303298 | 11/2006 |
| JP | 2010-62485 | 3/2010 |
| JP | 2011-187568 | 9/2011 |
| JP | 2013-4657 | 1/2013 |
| JP | 2013-65844 | 4/2013 |
| JP | 2014-75511 | 4/2014 |
| JP | 2015-175047 | 10/2015 |
| JP | 2017-135358 | 8/2017 |

* cited by examiner

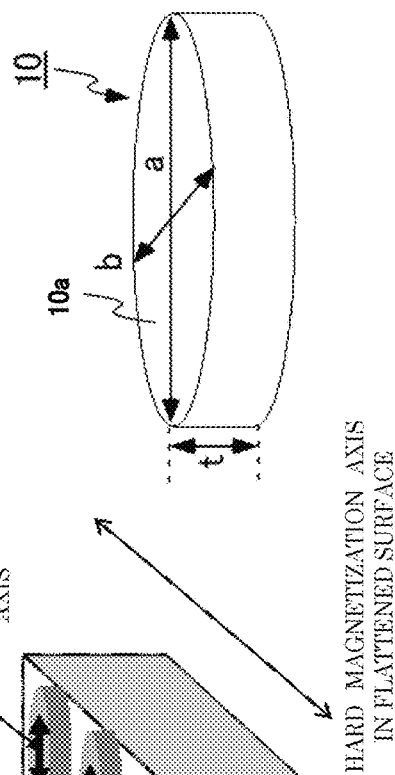
FIG.1A
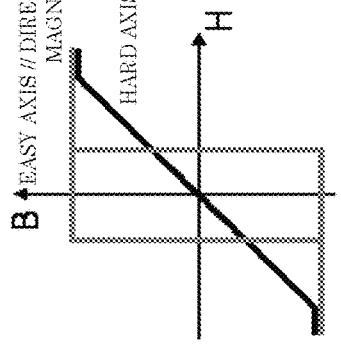
FIG.1B
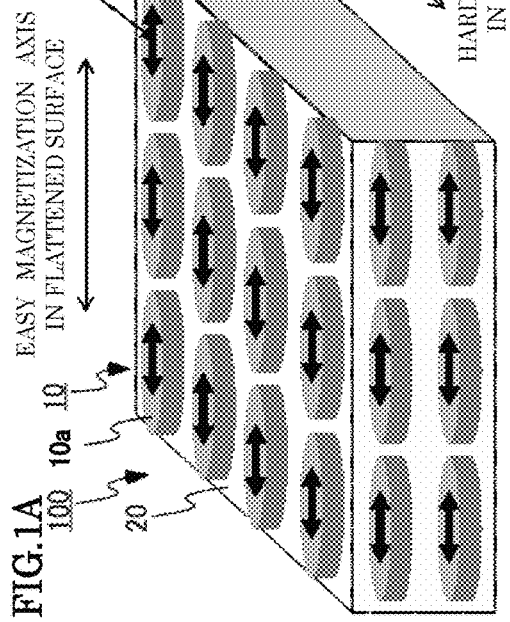
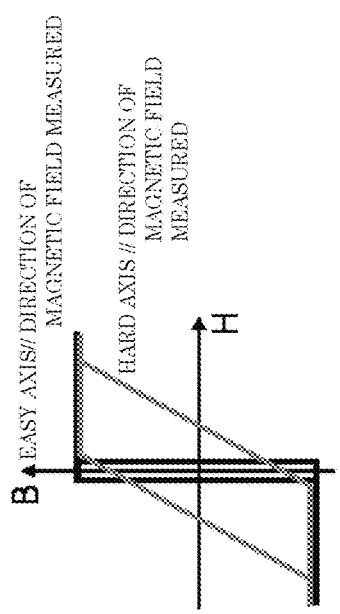
FIG.1C

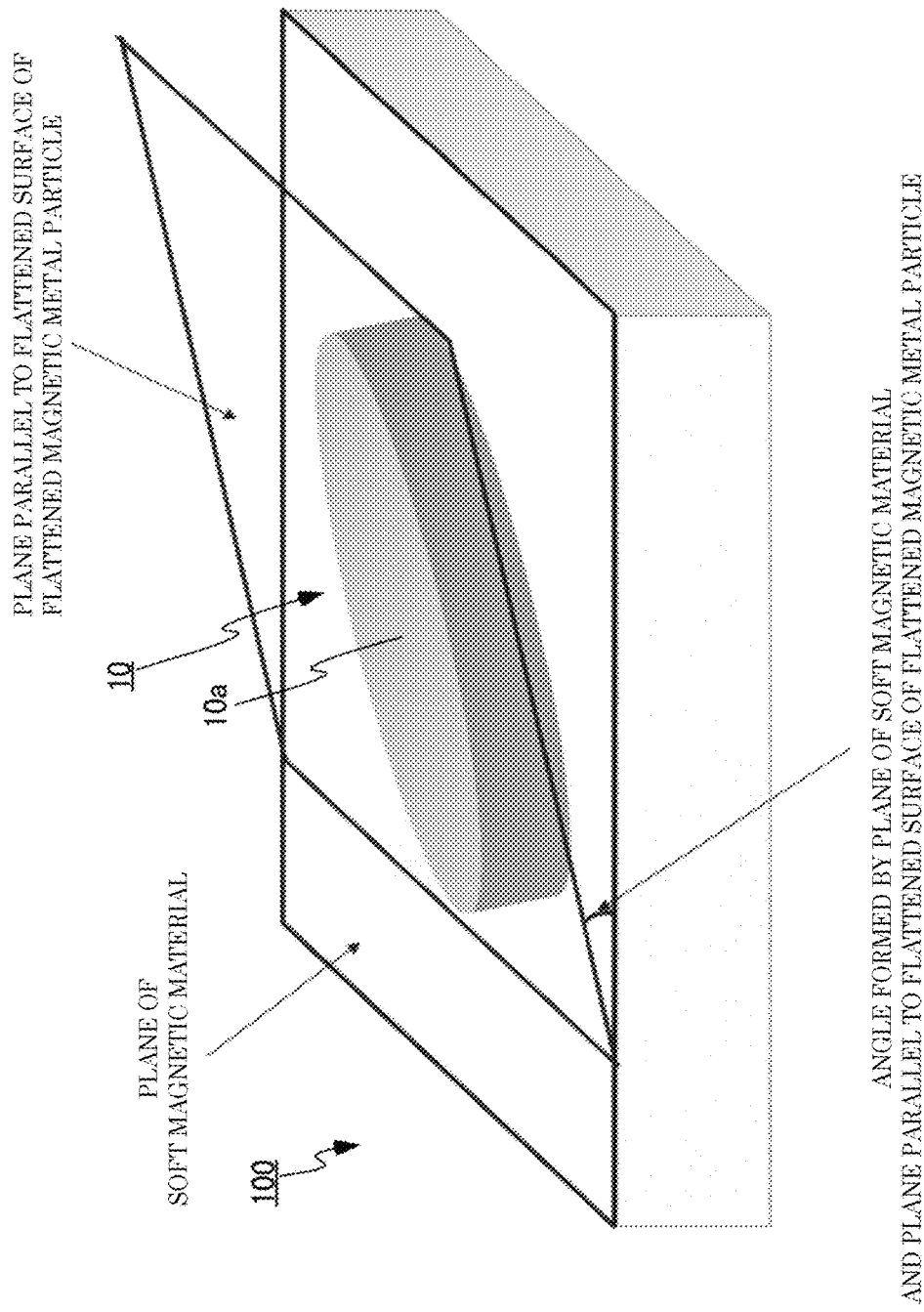

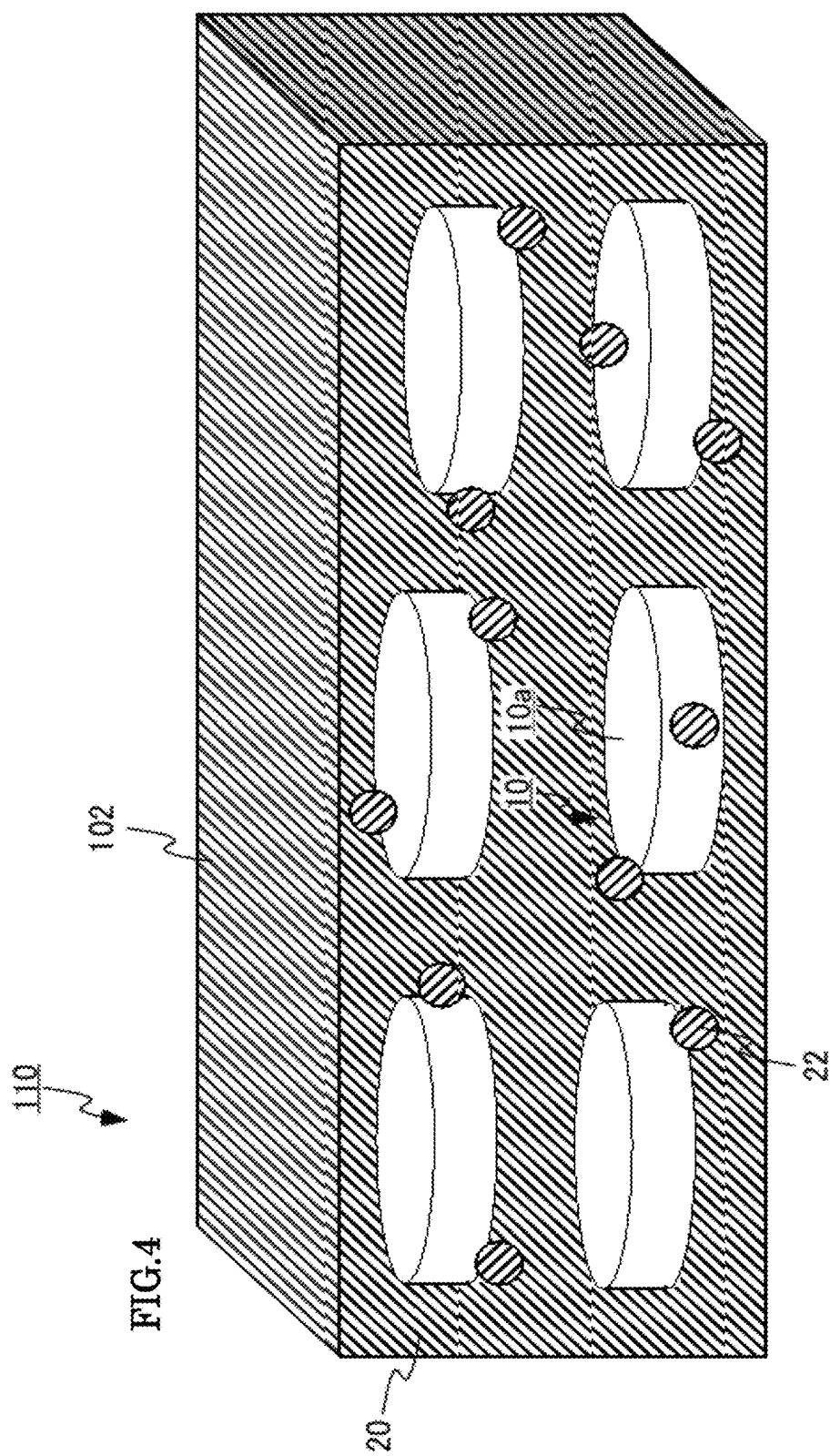

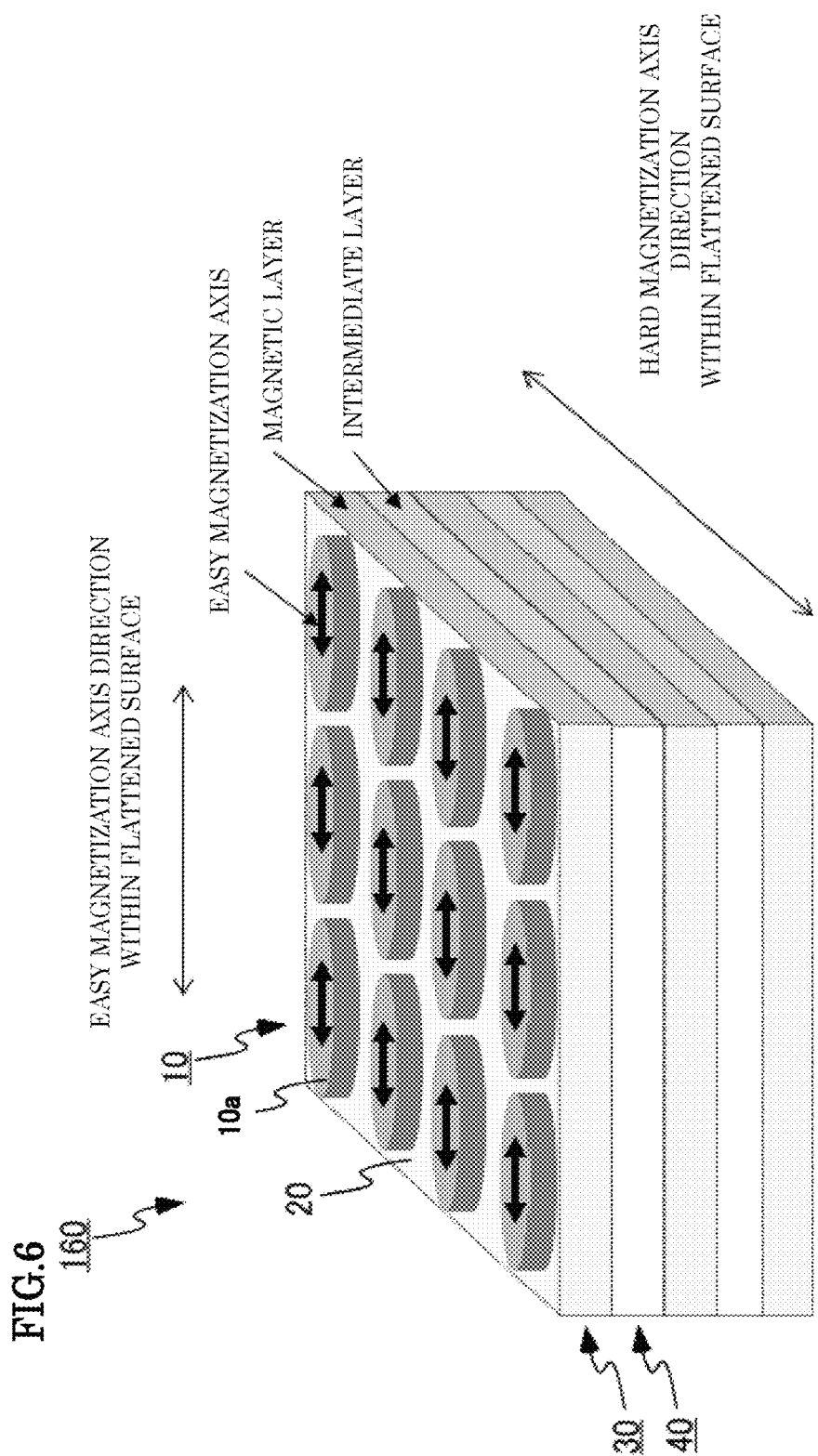

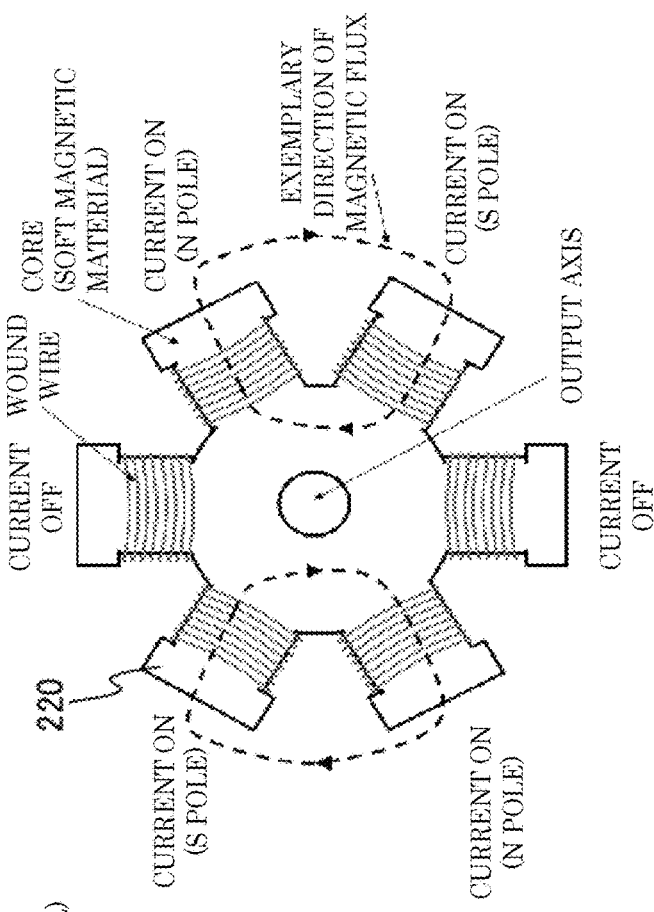
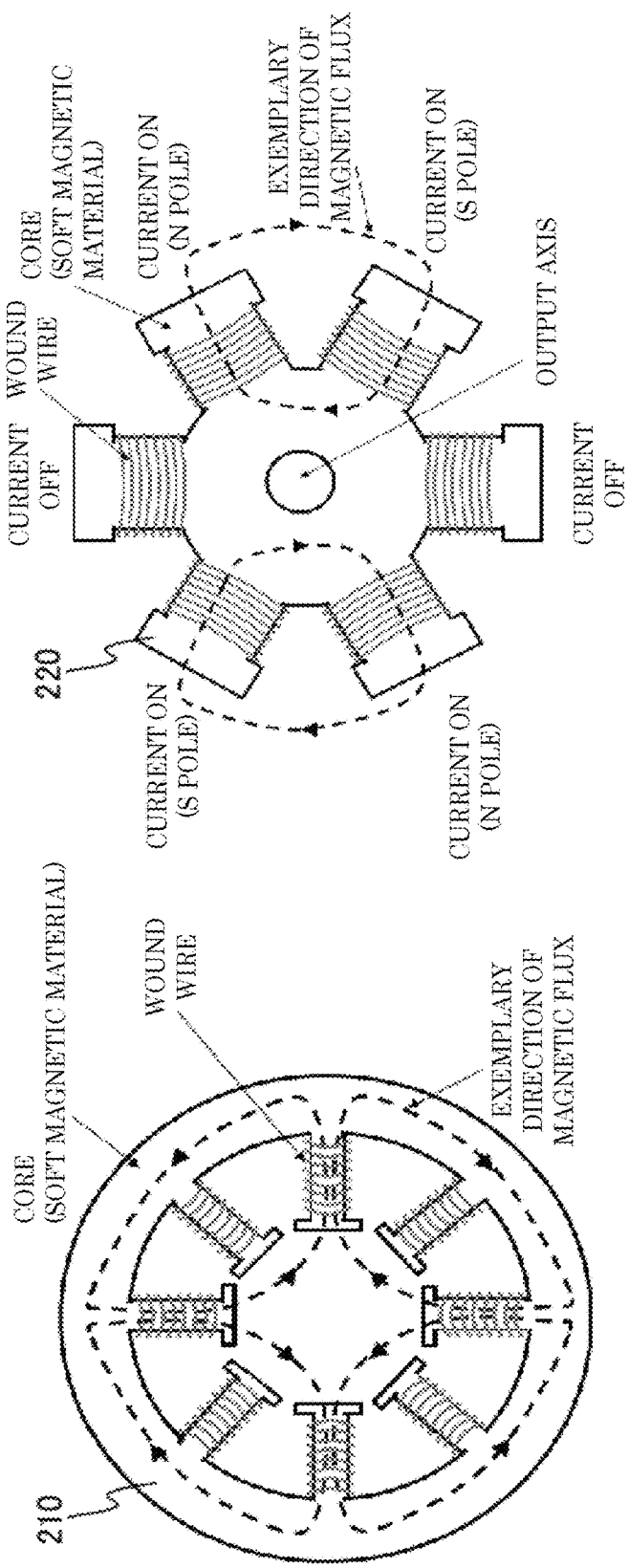

FIG.11A
EXEMPLARY CONCEPTUAL CROSS-SECTIONAL VIEW DIAGRAM OF RING-SHAPED INDUCTOR
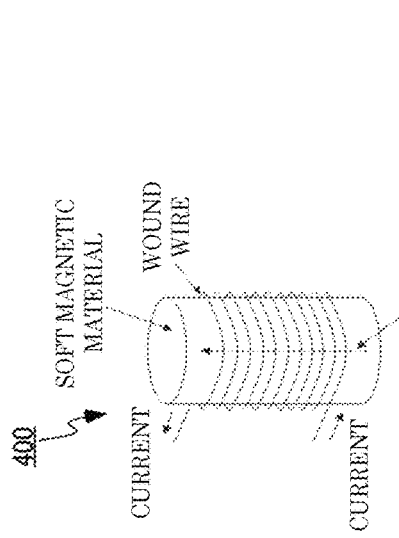
FIG.11B
EXEMPLARY CONCEPTUAL DIAGRAM OF ROD-SHAPED INDUCTOR
FIG.11C
EXEMPLARY CONCEPTUAL CROSS-SECTIONAL VIEW DIAGRAM OF CHIP INDUCTOR
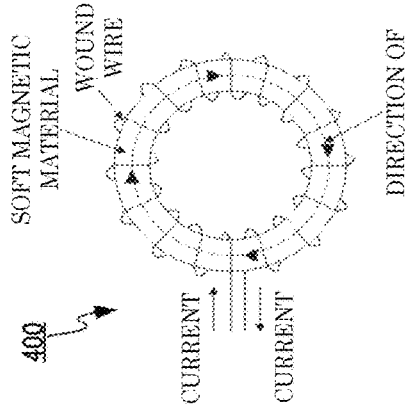
FIG.11D
EXEMPLARY CONCEPTUAL DIAGRAM OF PLANAR INDUCTOR
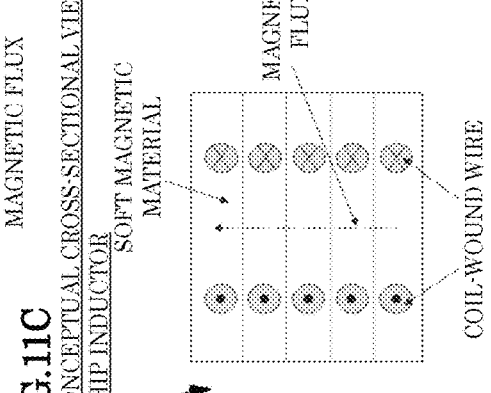

SOFT MAGNETIC MATERIAL, ROTATING ELECTRIC MACHINE, MOTOR, AND GENERATOR

CROSS-REFERENCE TO RELATED APPLICATION

This application is based upon and claims the benefit of priority from Japanese Patent Application No. 2015-181271, filed on Sep. 14, 2015, and Japanese Patent Application No. 2016-132906, filed on Jul. 4, 2016, the entire contents of which are incorporated herein by reference.

FIELD

Embodiments described herein relate generally to a soft magnetic material, a rotating electric machine, a motor, and a generator.

BACKGROUND

Currently, soft magnetic materials are applied to various systems and devices, such as rotating electric machines (for example, motors and generators), potential transformers, inductors, transformers, magnetic inks and antenna devices, and thus, soft magnetic materials are regarded as very important materials. In these component parts, the real part of the magnetic permeability (real part of the relative magnetic permeability), $\mu'$, of a soft magnetic material is utilized. Therefore, in the case of actual use, $\mu'$ should be controlled in accordance with the working frequency band. Furthermore, in order to realize a highly efficient system, it is necessary to use a material having a loss that is as low as possible. That is, the imaginary part of the magnetic permeability (imaginary part of the relative magnetic permeability), $\mu''$ (corresponding to a loss), needs to be minimized as far as possible. In regard to the loss, the loss factor, $\tan \delta$ $(=\mu''/\mu' \times 100(\%))$, serves as a criterion, and as $\mu''$ becomes smaller relative to $\mu'$, the loss factor $\tan \delta$ becomes smaller, which is preferable. In order to attain such conditions, it is necessary to make the core loss small, that is to say, it is necessary to make the eddy current loss, hysteresis loss, ferromagnetic resonance loss, and residual loss (other losses) as small as possible. In order to make the eddy current loss small, it is effective to increase the electrical resistance, or decrease the sizes of metal parts, or finely divide the magnetic domain structure. In order to make the hysteresis loss small, it is effective to reduce coercivity or increase the saturation magnetization. In order to make the ferromagnetic resonance loss small, it is effective to make the ferromagnetic resonance frequency higher by increasing the anisotropic magnetic field of the material. Furthermore, in recent years, since there is an increasing demand for handling of high electric power, particularly, it is required that losses be small under the operation conditions in which the effective magnetic field applied to the material is large (high current, high voltage, and the like). To attain this end, it is preferable that the saturation magnetization of a soft magnetic material is as large as possible so as not to cause magnetic saturation. Furthermore, in recent years, increase of the working frequency band in systems and device equipment is underway (size reduction of equipment is enabled by frequency increase), and there is an urgent need for the development of a magnetic material having high magnetic permeability and low losses at high frequency and having excellent characteristics.

Furthermore, in recent years, due to the heightened awareness of the issues on energy saving and environmental issues, there is a strong demand to increase the efficiency of systems as high as possible. Particularly, since motor systems are responsible for the greater portion of electric power consumption in the world, efficiency enhancement of motors is very important. Above all, a core and the like that constitute a motor are formed from soft magnetic materials, and it is requested to increase the magnetic permeability or saturation magnetization of soft magnetic materials as high as possible, or to make the losses as low as possible. Furthermore, in regard to the magnetic wedge that is used in some motors, there is a demand for minimizing losses as far as possible. There is the same demand also for systems using transformers. In motors, transformers and the like, the demand for size reduction is also high, along with efficiency enhancement. In order to realize size reduction, it is essential to maximize the magnetic permeability and saturation magnetization of the soft magnetic material as far as possible. Furthermore, in order to also prevent magnetic saturation, it is important to make saturation magnetization as high as possible. Moreover, the need for increasing the operation frequency of systems is also high, and thus, there is a strong demand to develop a material having low losses in high frequency ranges.

Soft magnetic materials having high magnetic permeability and low losses are also used in inductance elements, antenna devices and the like, and among them, in recent years, attention has been paid to the application of soft magnetic materials particularly in power inductance elements that are used in power semiconductor devices. In recent years, the importance of energy saving and environmental protection has been actively advocated, and reduction of the amount of $CO_2$ emission and reduction of the dependency on fossil fuels have been indispensable. As the result, development of electric cars or hybrid cars that substitute gasoline cars is in active progress. Furthermore, technologies for utilizing natural energy such as solar power generation and wind power generation are regarded as key technologies for an energy saving society, and many developed countries are actively pushing ahead with the development of technologies for utilizing natural energy. Furthermore, the importance of establishment of home energy management systems (HEMS) and building and energy management systems (BEMS), which control the electric power generated by solar power generation, wind power generation or the like by a smart grid and supply the electric power to homes, offices and plants at high efficiency, as environment-friendly power saving system, has been actively advocated. In such a movement of energy saving, power semiconductor devices play a key role. Power semiconductor devices are semiconductor devices that control high electric power or energy with high efficiency, and examples thereof include individual power semiconductor devices such as an insulated gate bipolar transistor (IGBT), a metal oxide semiconductor field effect transistor (MOSFET), a power bipolar transistor and a power diode; power supply circuits such as a linear regulator and a switching regulator; and a large-scale integration (LSI) logic circuit for power management to control the above-mentioned devices. Power semiconductor devices are widely used in all sorts of equipment including electrical appliances, computers, automobiles and railways, and since expansion of the supply of these applied apparatuses, and an increase of the mounting ratio of power semiconductor devices in these apparatuses can be expected, a rapid growth in the market for power semiconductor devices in the future is anticipated. For example, inverters that are installed in many electrical appliances use power semiconductor devices nearly in all parts, and thereby extensive energy saving is made possible. Currently, silicon (Si) occupies a major part in power semiconductor devices; however, for a further increase in efficiency or further size reduction of equipment, utilizing silicon carbide (SiC) and gallium nitride (GaN) is considered effective. SiC and GaN have larger band gaps and larger breakdown fields than Si, and since the internal voltage can be made higher, elements can be made thinner. Therefore, the on-resistance of semiconductor devices can be lowered, and it is effective for loss reduction and efficiency enhancement. Furthermore, since SiC or GaN has high carrier mobility, the switching frequency can be made higher, and this is effective for size reduction of elements. Furthermore, since SiC in particular has higher thermal conductivity than Si, the heat dissipation ability is higher, and operation at high temperature is enabled. Thus, cooling systems can be simplified, and this is effective for size reduction. From the viewpoints described above, development of SiC and GaN power semiconductor devices is actively in progress. However, in order to realize the development, development of power inductor elements that are used together with power semiconductor devices, that is, development of soft magnetic materials having high magnetic permeability (high magnetic permeability and low losses), is indispensable. Regarding the characteristics required from magnetic materials in this case, high magnetic permeability in the driving frequency ranges, low magnetic loss, and high saturation magnetization that can cope with large current, are needed. If saturation magnetization is high, it is difficult to cause magnetic saturation even if a high magnetic field is applied, and a decrease in the effective inductance value can be suppressed. As a result, the direct current superimposition characteristics of the device are improved, and the efficiency of the system is increased.

Furthermore, a magnetic material having high magnetic permeability and low losses at high frequency is expected to be applied to high frequency communication equipment devices such as antenna devices. As a method effective for size reduction of antennas and power saving, there is available a method of using an insulated substrate having high magnetic permeability (high magnetic permeability and low losses) as an antenna substrate, and performing transmission and reception of electric waves by dragging the electric waves that should reach an electronic component or a substrate inside a communication apparatus from antennas into the antenna substrate, without allowing the electric waves to reach the electronic component or substrate. As a result, size reduction of antennas and power saving are made possible, and at the same time, the resonance frequency band of the antennas can also be broadened, which is preferable.

In addition, examples of other characteristics that are required when magnetic materials are incorporated into the various systems and devices described above, include high thermal stability, high oxidation resistance, high strength, and high toughness. Also, in order for the magnetic materials to be applied to complicated shapes, a pressed powder is preferable to materials having a sheet shape or a ribbon shape. However, generally, in the case of the pressed powder, it is well known that characteristics such as saturation magnetization, magnetic permeability, losses, strength and toughness are not so good. Thus, there is a strong demand for characteristics enhancement.

Next, in regard to conventional soft magnetic materials, the kinds of the soft magnetic materials and their problems will be described.

An example of an existing soft magnetic material for systems of 10 kH or less is a silicon steel sheet (FeSi). A silicon steel sheet is a material that is employed in most of rotating electric machines (for example, motors and generators) that have been used for a long time and handle large power, and the core materials of transformers. Highly characterized materials ranging from non-oriented silicon steel sheets to grain-oriented silicon steel sheets can be obtained, and compared to the early stage of discovery, a progress has been made; however, in recent years, it is considered that characteristics improvement has reached a limit. Regarding the characteristics, it is particularly critical to simultaneously satisfy high saturation magnetization, high magnetic permeability, and low losses. Studies on materials that surpass silicon steel sheets are actively conducted globally, mainly based on the compositions of amorphous materials and nanocrystalline materials; however, a material composition that surpasses silicon steel sheets in all aspects has not yet been found. Furthermore, studies also have been conducted on pressed powders that are applicable to complicated shapes; however, pressed powders have a defect that they have poor characteristics compared to sheets or ribbons.

Examples of conventional soft magnetic materials for systems of 10 kHz to 100 kHz include SENDUST (Fe—Si—Al), nanocrystalline FINEMET (Fe—Si—B—Cu—Nb), ribbons or pressed powders of Fe-based or Co-based amorphous glass, and MnZn-based ferrite materials. However, all of these materials do not completely satisfy characteristics such as high magnetic permeability, low losses, high saturation magnetization, high thermal stability, high oxidation resistance, high strength and high toughness, and are insufficient.

Examples of conventional soft magnetic materials of 100 kHz or higher (MHz frequency band or higher) include NiZn-based ferrites and hexagonal ferrites; however, these materials have insufficient magnetic characteristics at high frequency.

From the circumstances described above, development of a soft magnetic material which satisfies high saturation magnetization, high magnetic permeability, low losses, high thermal stability, high oxidation resistance, high strength and high toughness, and can cope with the production of pressed powder that can be applied to complicated shapes, is preferable.

BRIEF DESCRIPTION OF THE DRAWINGS

FIGS. 1A to 1C are conceptual diagrams for a soft magnetic material according to a first embodiment.

FIG. 2 is a diagram for explaining the alignment of flattened magnetic metal particles.

FIG. 4 is a schematic diagram for a soft magnetic material according to a third embodiment having eutectic particles.

FIG. 6 is a conceptual diagram for a soft magnetic material according to a fourth embodiment having a laminated structure.

FIGS. 9A and 9B are conceptual diagrams for a motor core according to the fifth embodiment.

FIG. 11A to FIG. 11D are conceptual diagrams for an inductor according to the fifth embodiment.

DETAILED DESCRIPTION

Figure 3A:
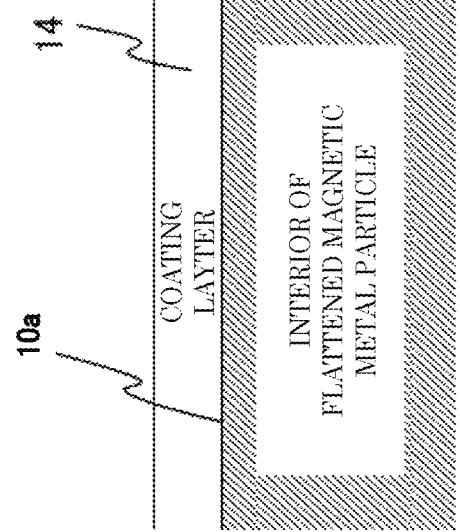
FIGS. 3A and 3B are schematic diagrams for a soft magnetic material according to a second embodiment.

Hereinafter, embodiments will be described using the drawings. Meanwhile, in the drawings, identical or similar sites are assigned with the same or similar reference numbers.

(First Embodiment)

The soft magnetic material of the present embodiment includes flattened magnetic metal particles including at least one magnetic metal selected from iron (Fe), cobalt (Co) and nickel (Ni), each of the flattened magnetic metal particles having a thickness of from 10 nm to 100 μm, an aspect ratio of from 5 to 10,000, and a lattice strain of from 0.01% to 10%, and being oriented with magnetic anisotropy in one direction within aligned flattened surface; and an interposed phase existing between the flattened magnetic metal particles and including at least one of oxygen (O), carbon (C), nitrogen (N) and fluorine (F).

That is, the soft magnetic material 100 of the present embodiment is a pressed powder composed of flattened magnetic metal particles 10 and an interposed phase. At this time, the flattened magnetic metal particles 10 are oriented in a form such that, if possible, flattened surfaces 10a are aligned and laminated, and have magnetic anisotropy in one direction within the flattened surface 10a of a flattened magnetic metal particle 10. Here, the flattened magnetic metal particles 10 are flattened particles or flaky particles having a flattened shape or flaky shape.

The magnitude of uniaxial magnetic anisotropy within this flattened surface 10a is preferably from 0.1 Oe to 10 kOe, more preferably from 1.0 Oe to 1 kOe, and even more preferably from 1 Oe to 100 Oe. Furthermore, whether the flattened magnetic metal particles have magnetic anisotropy, or to what extent the flattened magnetic metal particles have magnetic anisotropy, can be simply evaluated by analyzing the anisotropy by varying the direction using, for example, a vibrating sample magnetometer (VSM). A pressed powder obtained using conventional flattened particles is magnetically isotropic within a flattened surface 10a, and therefore, such a pressed powder is fundamentally different from the pressed powder of the present embodiment. When a pressed powder has magnetic anisotropy within a flattened surface 10a, magnetic characteristics are significantly enhanced.

First, in a case in which the magnetic domain structure of the flattened magnetic metal particles 10 is a multi-domain structure, magnetization proceeds by domain wall displacement; the coercivity in the easy axis direction within the flattened surface 10a becomes smaller than that in the hard axis direction, and a loss (hysteresis loss) is decreased. Furthermore, magnetic permeability in the easy axis direction becomes higher than that in the hard axis direction. Furthermore, compared to the case of isotropic flattened magnetic metal particles, particularly the coercivity in the easy axis direction is lower in the case of flattened magnetic metal particles having magnetic anisotropy, and thereby losses become smaller, which is preferable. Also, magnetic permeability is high, and it is preferable. That is, when flattened magnetic metal particles have magnetic anisotropy within the flattened surface 10a, magnetic characteristics are enhanced compared to an isotropic material. Particularly, magnetic characteristics are superior in the easy axis direction within the flattened surface 10a than in the hard axis direction.

Next, in a case in which the magnetic domain structure of the flattened magnetic metal particles 10 is a single domain structure, magnetization proceeds through rotating magnetization; in this case, coercivity in the hard axis direction within the flattened surface 10a becomes smaller than that in the easy axis direction, and losses are decreased. In a case in which magnetization proceeds completely by rotation magnetization, coercivity becomes zero, and thereby the hysteresis loss becomes zero, which is preferable.

Furthermore, whether magnetization proceeds by domain wall displacement (domain wall displacement type) or by rotation magnetization (rotation magnetization type) is determined by whether the magnetic domain structure becomes a multi-domain structure or a single domain structure. At this time, whether the magnetic domain structure is a multi-domain structure or a single domain structure is determined by the size (thickness or aspect ratio) of the flattened magnetic metal particles 10, composition, magnetic interaction between particles, and the like. For example, as the thickness of the flattened magnetic metal particles 10 is smaller, the magnetic domain structure is more likely to become a single domain structure. When the thickness is from 10 nm to 1 μm, particularly from 10 nm to 100 nm, the magnetic domain structure easily becomes a single domain structure. In regard to the composition, for a composition having high crystal magnetic anisotropy, even if the thickness is large, a single domain structure is easily maintained. For a composition having low crystal magnetic anisotropy, if the thickness is not small, it tends to be difficult to maintain a single domain structure. That is, the thickness of the boundary line between whether the magnetic domain structure becomes a single domain structure and whether the magnetic domain structure becomes a multi-domain structure is also changed by the composition. Furthermore, when each flattened magnetic metal particle 10 magnetically interact with the neighboring ones, and the magnetic domain structure is stabilized, the magnetic domain structure easily becomes a single domain structure.

Fundamental conceptual diagrams of the present embodiment as disclosed above are described in FIGS. 1A to 1C. FIG. 1A is a conceptual diagram of a soft magnetic material according to the present embodiment. FIG. 1B is a conceptual diagram of the flattened magnetic metal particles 10 of the present embodiment. FIG. 1C describes the behavior of a magnetization curve (B-H curve) both in the case that magnetization proceeds by domain wall displacement and in the case that magnetization proceeds by rotation magnetization. The determination of whether the magnetization behavior is of the domain wall displacement type or the rotation magnetization type can be made simply as follows. First, within a plane of a soft magnetic material 100 (a plane that is parallel to a flattened surface of a flattened magnetic metal particle), magnetization is analyzed by varying the direction in which a magnetic field is applied, and two directions in which the difference in the magnetization curve becomes the largest (at this time, the two directions are directions tilted by 90° from each other) are found out. Next, the curves of the two directions are visually compared with FIG. 1C, and thereby it can be determined whether the magnetization behavior is of the domain wall displacement type or the rotation magnetization type.

In regard to the alignment of the flattened magnetic metal particles 10, a conceptual diagram of the alignment is shown in FIG. 2. According to the present specification, as the angle formed by a plane that is parallel to the flattened surface 10a of a flattened magnetic metal particle 10 and a flat surface of the soft magnetic material 100 is closer to 0°, the flattened magnetic metal particles 10 are defined to be aligned. Specifically, when the above-mentioned angle is determined for a large number of, for example, 10 or more, flattened magnetic metal particles 10, it is desirable that the average value of the angles is preferably from 0° to 45°, more preferably from 0° to 30°, and even more preferably from 0° to 10°.

The flattened magnetic metal particles 10 have a flattened shape; however, regarding the shape of the magnetic metal particles, a flattened shape is preferable to a spherical shape. That is, the aspect ratio of the flattened magnetic metal particle 10 is preferably from 5 to 10,000, and thereby magnetic permeability becomes high. Furthermore, since the ferromagnetic resonance frequency can be made high, the ferromagnetic resonance loss can be made small, which is preferable. The thickness t of the flattened magnetic metal particle 10 is preferably from 10 nm to 100 µm, more preferably from 10 nm to 1 µm, and even more preferably from 10 nm to 100 nm. As a result, when a magnetic field is applied in a direction parallel to the in-plane direction of the flattened surface 10a, the eddy current loss can be made sufficiently small, which is preferable. Furthermore, it is preferable that the thickness t is smaller, and the aspect ratio is higher, because the magnetic moment is confined in a direction parallel to the flattened surface 10a, and rotation magnetization easily proceeds.

The aspect ratio refers to the ratio between the dimension of a structure in a direction in which the length of a flattened magnetic metal particles 10 is the longest (long dimension), and the dimension of a structure in a direction in which the length of the metal particle 10 is the shortest (short dimension), that is, "long dimension/short dimension". Therefore, the aspect ratio is always 1 or greater. In the case of a perfectly spherical shape, since the long dimension and the short dimension are both identical to the diameter of the sphere, the aspect ratio is 1. The aspect ratio of a flattened magnetic metal particle 10 having a flattened shape is the ratio of diameter (long dimension)/thickness (short dimension) of the flattened surface 10a. In regard to the flattened magnetic metal particle 10 shown in FIG. 1B, when the minimum length in the flattened surface 10a is designated as b, the maximum length is designated as a, and the thickness is designated as t, the aspect ratio is calculated by the formula: (((a+b)/2)/t). Here, the term (a+b)/2 is the average of the minimum length b and the maximum length a in the flattened surface 10. The aspect ratio and the thickness t can be simply evaluated by an observation by transmission electron microscopy (TEM), an observation by scanning electron microscopy (SEM), or the like.

The lattice strain of the flattened magnetic metal particle 10 is preferably from 0.01% to 10%, more preferably from 0.01% to 5%, even more preferably from 0.01% to 1%, and even more preferably from 0.01% to 0.5%. As a result, magnetic anisotropy tends to be imparted to an appropriately significant extent, and the magnetic characteristics described above are enhanced, which is preferable.

The lattice strain can be calculated by analyzing in detail the line width obtainable by an X-ray diffraction (XRD) method. That is, by drawing a Halder-Wagner plot or a Hall-Williamson plot, the extent of contribution made by expansion of the line width can be separated into the crystal grain size and the lattice strain. The lattice strain can be calculated thereby. A Halder-Wagner plot is preferable from the viewpoint of reliability. In regard to the Halder-Wagner plot, reference may be made to, for example, N. C. Halder, C. N. J. Wagner, Acta Cryst., 20 (1966) 312-313. Here, a Halder-Wagner plot is represented by the following expression:

$$\frac{\beta^2}{\tan^2\theta} = \frac{K\lambda}{D}\frac{\beta}{\tan\theta\sin\theta} + 16\varepsilon^2, \varepsilon = \varepsilon_{max} = \frac{\sqrt{2\pi}}{2}\sqrt{\overline{\varepsilon^2}}$$

$$\left(\beta: \text{width of integration}, K: \text{constant}, \lambda: \text{wavelength},\right.$$

$$\left. D: \text{crystal grain size}, \sqrt{\overline{\varepsilon^2}}: \text{crystal strain (root mean square)}\right)$$

That is, $\beta^2/\tan^2\theta$ is plotted on the vertical axis, and $\beta/\tan\theta\sin\theta$ is plotted on the horizontal axis. The crystal grain size D is calculated from the gradient of the approximation straight line of the plot, and the lattice strain δ is calculated from the ordinate intercept. When the lattice strain obtained by the Halder-Wagner plot of the expression described above (lattice strain (root-mean-square)) is from 0.01% to 10%, more preferably from 0.01% to 5%, even more preferably from 0.01% to 1%, and still more preferably from 0.01% to 0.5%, magnetic anisotropy tends to be imparted to an appropriately significant extent, and the magnetic characteristics described above are enhanced, which is preferable.

The lattice strain analysis described above is a technique that is effective in a case in which a plurality of peaks can be detected by XRD; however, in a case in which the peak intensities in XRD are weak, and there are few peaks that can be detected (for example, in a case in which only one peak is detected), it is difficult to perform the analysis. In such a case, it is preferable to calculate the lattice strain by the following procedure. First, the composition is determined by inductively coupled plasma (ICP) emission spectroscopy, energy dispersive X-ray spectrometry (EDX), or the like, and the composition ratio of three magnetic metal elements, namely, Fe, Co and Ni, is calculated (in a case in which there are only two magnetic metal elements, the composition ratio of two elements; in a case in which there is only one magnetic metal element, the composition ratio of one element (=100%)). Next, an ideal lattice spacing $d_0$ is calculated from the composition of Fe—Co—Ni (refer to the values published in the literature, or the like. In some cases, an alloy of the composition is synthesized, and the lattice spacing is calculated by XRD measurement). Subsequently, the amount of strain can be determined by determining the difference between the lattice spacing d of the peaks of an analyzed sample and the ideal lattice spacing $d_0$. That is, in this case, the amount of strain is calculated by the expression: $(d-d_0)/d_0 \times 100(\%)$. Thus, in regard to the analysis of the lattice strain, it is preferable to use the two above-described techniques appropriately depending on the state of peak intensity, and depending on cases, it is preferable to evaluate the amount of strain by using the two techniques in combination.

The lattice spacing in the flattened surface 10a of a flattened magnetic metal particle varies with direction, and the proportion of the difference between the maximum lattice spacing $d_{max}$ and the minimum lattice spacing $d_{min}$ (=$(d_{max}-d_{min})/d_{min} \times 100(\%)$) is preferably from 0.01% to 10%, more preferably from 0.01% to 5%, even more preferably from 0.01% to 1%, and still more preferably from 0.01% to 0.5%. As a result, magnetic anisotropy tends to be imparted appropriately significantly, and the magnetic characteristics described above are enhanced, which is preferable. Furthermore, the lattice spacing can be determined simply by an XRD analysis. When this XRD analysis is carried out using a soft magnetic material 100 while varying the direction within a plane, the difference of lattice constants in accordance with the direction can be determined.

In regard to the crystallites of the flattened magnetic metal particles 10, it is preferable that either the crystallites are unidirectionally linked in a row within the flattened surface 10a, or the crystallites are rod-shaped and are unidirectionally oriented within the flattened surface 10a. As a result, magnetic anisotropy tends to be imparted appropriately, and the magnetic characteristics described above are enhanced, which is preferable.

The flattened magnetic metal particles 10 include two magnetic metals Fe and Co, and it is preferable that Co is included at a proportion of from 10 atom % to 60 atom %, and more preferably at a proportion of from 10 atom % to 40 atom %, relative to the total amount of Fe and Co. As a result, magnetic anisotropy tends to be imparted appropriately, and the magnetic characteristics described above are enhanced, which is preferable. Furthermore, a Fe—Co system is preferable because the system can easily realize high saturation magnetization. When the composition range of Fe and Co is included in the above-described range, higher saturation magnetization can be realized, and it is preferable.

It is preferable that the flattened magnetic metal particles 10 includes at least one non-magnetic metal selected from the group consisting of magnesium (Mg), aluminum (Al), silicon (Si), calcium (Ca), zirconium (Zr), titanium (Ti), hafnium (Hf), zinc (Zn), manganese (Mn), barium (Ba), strontium (Sr), chromium (Cr), molybdenum (Mo), silver (Ag), gallium (Ga), scandium (Sc), vanadium (V), yttrium (Y), niobium (Nb), lead (Pb), copper (Cu), indium (In), tin (Sn), and rare earth elements. As a result, thermal stability or oxidation resistance of the flattened magnetic metal particles 10 can be increased. Above all, Al and Si are particularly preferred because these elements can easily form a solid solution with Fe, Co and Ni, which are main components of the flattened magnetic metal particles 10, and contribute to enhancement of thermal stability or oxidation resistance.

Meanwhile, in order to induce magnetic anisotropy, there is also available a method of making the flattened magnetic metal particles 10 amorphous as far as possible, and inducing magnetic anisotropy in one direction in plane by means of a magnetic field or strain. For this reason, it is desirable that the composition of the flattened magnetic metal particles 10 is made into a composition that can make the particles amorphous as easily as possible. From this point of view, it is preferable that the magnetic metal included in the flattened magnetic metal particles 10 includes at least one additive metal selected from boron (B), Si, C, Ti, Zr, Hf, Nb, tantalum (Ta), Mo, Cr, Cu, tungsten (W), phosphorus (P), N, and Ga at a proportion in total of from 0.001 atom % to 25 atom % relative to the total amount of magnetic metals, non-magnetic metals, and additive metals.

It is preferable that the flattened surfaces 10a of the flattened magnetic metal particles 10 are crystallographically oriented. The direction of orientation is preferably the (110) plane oriented or the (111) plane oriented, and more preferably the (110) plane oriented. In a case in which the crystal structure of the flattened magnetic metal particles 10 is a body-centered cubic structure (bcc), the (110) plane orientation is preferred, and in a case in which the crystal structure of the flattened magnetic metal particles 10 is a face-centered cubic structure (fcc), the (111) plane orientation is preferred. As a result, magnetic anisotropy tends to be imparted appropriately, and the magnetic characteristics described above are enhanced, which is preferable.

Furthermore, regarding more preferred directions of orientation, the (110)[111] direction and the (111)[110] direction are preferred, and the (110) [111] direction is more preferred. In a case in which the crystal structure of the flattened magnetic metal particles 10 is a body-centered cubic structure (bcc), orientation in the (110) [111] direction is preferred, and in a case in which the crystal structure of the flattened magnetic metal particles 10 is a face-centered cubic structure (fcc), orientation in the (111)[110] direction is preferred. As a result, magnetic anisotropy tends to be imparted appropriately, and the magnetic characteristics described above are enhanced, which is preferable.

Furthermore, according to the present specification, the "(110) [111] direction" means that the slip plane is the (110) plane or a plane that is crystallographically equivalent to the (110) plane, that is, the {110} plane, and the slip direction is the [111] direction or a direction that is crystallographically equivalent to the [111] direction, that is, the <111> direction. The same also applies to the (111) [110] direction. That is, the (111) [110] direction means that the slip plane is the (111) plane or a plane that is crystallographically equivalent to the (111) plane, that is, the {111} plane, and the slip direction is the [110] direction or a direction that is crystallographically equivalent to the [110] direction, that is, the <110> direction.

The crystal structure of the flattened magnetic metal particles 10 is preferably a body-centered cubic structure; however, more preferably, the crystal structure is preferably a "crystal structure having a mixed phase of a body-centered cubic structure and a face-centered cubic structure", which partially has a crystal structure of a face-centered cubic structure. As a result, magnetic anisotropy tends to be imparted appropriately, and the magnetic characteristics described above are enhanced, which is preferable.

The interposed phase 20 includes at least one of oxygen (O), carbon (C), nitrogen (N), and fluorine (F). It is because electric resistance can be increased thereby. It is preferable that the interposed phase 20 has higher electrical resistivity than that of the flattened magnetic metal particles 10. It is because the eddy current loss of the flattened magnetic metal particles 10 can be reduced thereby. Since the interposed phase exists in a state of being surrounded by the flattened magnetic metal particles 10, oxidation resistance and thermal stability of the flattened magnetic metal particles 10 can be enhanced, which is preferable. Among these, it is more preferable that the interposed phase 20 includes oxygen, from the viewpoints of high oxidation resistance and high thermal stability. Since the interposed phase 20 also plays a role of mechanically attaching the flattened magnetic metal particles 10, it is also preferable from the viewpoint of high strength.

Furthermore, it is preferable that the interposed phase 20 is included in an amount of from 0.01 wt % to 80 wt %, more preferably from 0.1 wt % to 60 wt %, and even more preferably from 0.1 wt % to 40 wt %, relative to the total amount of the soft magnetic material. If the proportion of the interposed phase 20 is too large, the proportion of the flattened magnetic metal particles 10 that are responsible for magnetic properties becomes small. Therefore, the saturation magnetization or magnetic permeability of the soft magnetic material 100 is decreased thereby, and it is not preferable. On the contrary, if the proportion of the interposed phase 20 is too small, the adhesiveness between the flattened magnetic metal particles 10 and the interposed phase 20 becomes weak, and it is not preferable from the viewpoints of thermal stability or mechanical characteristics such as strength and toughness. From the viewpoints of magnetic characteristics such as saturation magnetization and magnetic permeability, thermal stability, and mechanical characteristics, an optimal proportion of the interposed phase 20 is preferably from 0.01 wt % to 80 wt %, more preferably from 0.1 wt % to 60 wt %, and even more preferably from 0.1 wt % to 40 wt %, relative to the total amount of the soft magnetic material.

Furthermore, it is preferable that the lattice mismatch proportion between the interposed phase 20 and the flattened magnetic metal particles 10 is from 0.1% to 50%. As a result, magnetic anisotropy tends to be imparted appropriately, and the magnetic characteristics described above are enhanced, which is preferable. In order to set the lattice mismatch to the range described above, the desired lattice mismatch can be realized by selecting a combination of the composition of the interposed phase and the composition of the flattened magnetic metal particles 10. For example, Ni of a fcc structure has a lattice constant of 3.52 Å, and MgO of a NaCl type structure has a lattice constant of 4.21 Å. Thus, the lattice mismatch between the two is $(4.21-3.52)/3.52 \times 100 = 20\%$. That is, when the main composition of the flattened magnetic metal particles 10 includes Ni of the fcc structure, and the main composition of the interposed phase 20 includes MgO, the lattice mismatch can be set to 20%. As such, the lattice mismatch can be set to the range described above, by selecting the combination of the main composition of the flattened magnetic metal particles 10 and the main composition of the interposed phase 20.

Next, the method for producing the soft magnetic material 100 of the first embodiment will be explained. The production method is not particularly limited, and the production method will be explained only for illustrative purposes.

First, a ribbon or a thin film is produced using a film-forming apparatus such as a single roll cooling apparatus or a sputtering apparatus. At this time, in regard to the film-forming method, it is desirable to produce a film that is imparted with uniaxial anisotropy within the film plane, through film formation in a magnetic field, rotary film formation or the like. Furthermore, in the case of using a film-forming apparatus, the thickness can be made small, the structure may be easily refined, and rotation magnetization may easily occur. Therefore, in the case of producing a rotation magnetization type film, it is desirable to use a film-forming method.

Next, this ribbon or thin film is cut into an appropriate size using a mixing apparatus or the like. Subsequently, small cut pieces are collected and subjected to pulverization and rolling, for example, a pulverizing apparatus such as a planetary mill. The pulverizing apparatus is preferably an apparatus capable of applying strong gravitational acceleration; however, there is no particular preference for the type of the pulverizing apparatus. Examples include a planetary mill, a bead mill, a rotary ball mill, a vibratory ball mill, an agitating ball mill (attritor), a jet mill, a centrifuge, and techniques combining a mill and centrifugation. For example, a high-power planetary mill apparatus that can apply a gravitational acceleration of several ten G is preferred. In the case of a high-power planetary mill apparatus, an inclined type planetary mill apparatus is more preferred, in which the direction of rotational gravitational acceleration and the direction of revolutionary gravitational acceleration are not directions on the same straight line, but are directions that form an angle. In a conventional planetary mill apparatus, the direction of rotational gravitational acceleration and the direction of revolutionary gravitational acceleration are on the same straight line; however, in an inclined type planetary mill apparatus, since the vessel performs a rotating movement in an inclined state, the direction of rotational gravitational acceleration and the direction of revolutionary gravitational acceleration are not on the same straight line, but form an angle. As a result, power is efficiently transferred to the sample, and pulverization and rolling is carried out with high efficiency, which is preferable. Furthermore, in consideration of mass productivity, a bead mill apparatus that facilitates treatment in large quantities is preferred. In order to perform pulverization efficiently, it is more preferable to perform a pulverization treatment at low temperature using liquid nitrogen or the like.

It is desirable that the treatment is carried out by repeating cutting, pulverization, and rolling as described above, so that flattened magnetic metal particles 10 having a required thickness and a required aspect ratio are obtained. At this time, when pulverization and rolling are performed such that the thickness is from 10 nm to 100 μm, preferably from 10 nm to 1 μm, and more preferably from 10 nm to 100 nm, particles that can easily undergo rotation magnetization are obtained. Furthermore, it is desirable that lattice strain is appropriately removed from the flattened magnetic metal particles 10 thus obtained, through a heat treatment. At this time, it is more desirable that the flattened magnetic metal particles 10 are subjected to a heat treatment in a magnetic field. Subsequently, the flattened magnetic metal particles 10 thus obtained are mixed with a material that constitutes the interposed phase, and the mixture is molded. At the time of molding, molding is performed in a magnetic field, and the flattened particles are aligned. Finally, when the flattened magnetic metal particles are subjected to a heat treatment while a magnetic field is applied in one direction within a flattened surface 10a, the lattice strain is adjusted to a value from 0.01% to 10% (more preferably from 0.01% to 5%, even more preferably from 0.01% to 1%, and still more preferably from 0.01% to 0.5%), and the proportion of the difference between the maximum value and the minimum value of the lattice spacing in the plane is adjusted to a value from 0.01% to 10% (more preferably from 0.01% to 5%, even more preferably from 0.01% to 1%, and still more preferably from 0.01% to 0.5%). The soft magnetic material 100 obtained as such include flattened magnetic metal particles 10 that are oriented with magnetic anisotropy in one direction within a flattened surface 10a.

It is more preferable if the magnetic field that is applied during the process is larger, and it is preferable to apply a magnetic field of 1 kOe or greater, and more preferably 10 kOe or greater. Furthermore, in regard to the heat treatment performed during the process, the temperature is preferably from 50° C. to 800° C., and more preferably from 200° C. to 600° C. When the temperature is set to this temperature range, the lattice strain can be appropriately relieved. It is preferable to perform the heat treatment in an atmosphere at a low oxygen concentration or a vacuum atmosphere, and it is more preferable to perform the heat treatment in a reducing atmosphere of $H_2$, CO, $CH_4$ or the like. In this way, even if the flattened magnetic metal particles 10 have been oxidized, the oxidized metal can be reduced to metal, by performing a heat treatment in a reducing atmosphere. As a result, when the flattened magnetic metal particles 10 that have been oxidized to have decreased saturation magnetization are reduced, the saturation magnetization can be restored (magnetic permeability can also be increased). On the other hand, for reducing the process cost, an atmosphere with a low oxygen concentration, such as an atmosphere of Ar or $N_2$, or a vacuum atmosphere is preferred. Meanwhile, if crystallization of the flattened magnetic metal particles 10 proceeds noticeably as a result of a heat treatment, characteristics are deteriorated (coercivity increases, and magnetic permeability decreases). Therefore, it is preferable to select the conditions of the heat treatment so as to suppress excessive crystallization.

In regard to the flattened magnetic metal particles 10 that have been subjected to pulverization and rolling, in a case in which the thickness is from 10 nm to 100 µm, more preferably from 10 nm to 1 µm, and even more preferably from 10 nm to 100 nm, when a heat treatment is performed at a temperature of from 200° C. to 600° C. in a magnetic field of 10 kOe or greater, and preferably 20 kOe or greater, crystallites can be unidirectionally linked in a row in the direction of the magnetic field applied, or when crystallization proceeds, crystallization proceeds in a rod shape, so that rod-shaped crystallites can be easily oriented in the direction of the magnetic field. Therefore, it is more preferable.

Thus, when the soft magnetic material of the present embodiment is used, a soft magnetic material having excellent characteristics, particularly in view of high magnetic permeability, low losses, and the like, can be realized.

(Second Embodiment)

The soft magnetic material 120 of the present embodiment is different from the soft magnetic material of the first embodiment, in that at least a portion of the surface of the flattened magnetic metal particles is covered with a coating layer having a thickness of from 0.1 nm to 1 µm and including at least one of oxygen (O), carbon (C), nitrogen (N) and fluorine (F). Here, any matters overlapping with the content of the first embodiment will not be described repeatedly.

Figure 3B:
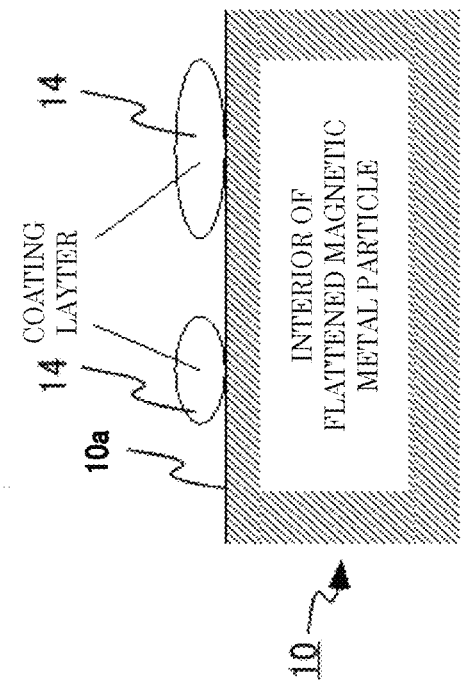

FIGS. 3A and 3B is a schematic diagram of flattened magnetic metal particles 10 of the present embodiment.

A coating layer 14 includes at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and it is more preferable that the coating layer 14 includes at least one of oxygen (O), carbon (C), nitrogen (N) and fluorine (N). The non-magnetic metal is particularly preferably Al or Si, from the viewpoint of thermal stability. In a case in which the flattened magnetic metal particles 10 include at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn and rare earth elements, it is more preferable that the coating layer 14 includes at least one non-magnetic metal that is the same as the non-magnetic metal employed as one constituent component of the flattened magnetic metal particles 10. Among the oxygen (O), carbon (C), nitrogen (N) and fluorine (F), it is preferable that the coating layer includes oxygen (O), and an oxide or a composite oxide is preferred. This is because of the ease of formation, oxidation resistance, and thermal stability of the coating layer 14. As a result, the adhesiveness of the coating layer 14 to the flattened magnetic metal particles 10 can be increased, and the thermal stability and oxidation resistance of the soft magnetic material can be enhanced. The coating layer 14 can enhance the thermal stability or oxidation resistance of the flattened magnetic metal particles 10, and can also increase the electrical resistance of the flattened magnetic metal particles 10. By increasing electrical resistance, the eddy current loss can be suppressed, and the frequency characteristics of the magnetic permeability can be enhanced.

Therefore, it is preferable that the coating layer 14 has high electrical resistance, and the coating layer 14 preferably has an electrical resistance value of, for example, 1 mΩ·cm or larger.

Furthermore, the presence of the coating layer 14 is also preferable from the viewpoint of magnetic characteristics. In regard to the flattened magnetic metal particles 10, since the dimension of the thickness is smaller than the dimension of the flattened surface 10a, the metal particles can be regarded as a pseudo thin film. At this time, a product obtained by forming the coating layer 14 on the surface of the flattened magnetic metal particles 10 and compacting the particles, may be considered to have a pseudo laminated thin film structure, and the magnetic domain structure is stabilized in terms of energy. As a result, coercivity can be reduced (consequently, the hysteresis loss is reduced), which is preferable. At this time, the magnetic permeability also becomes high, and it is preferable. From such a viewpoint, it is more preferable that the coating layer 14 is non-magnetic (magnetic domain structure is easily stabilized).

From the viewpoints of thermal stability, oxidation resistance, and electrical resistance, it is more preferable if the thickness of the coating layer 14 is larger. However, if the thickness of the coating layer is too large, the saturation magnetization becomes small, and the magnetic permeability also becomes small, which is not preferable. Furthermore, even from the viewpoint of magnetic characteristics, if the thickness is too large, the "effect of decreasing coercivity and losses, and increasing magnetic permeability which can be produced by stabilizing the magnetic domain structure" is reduced. In consideration of the above-described matters, a preferred thickness of the coating layer is from 0.1 nm to 1 µm, and more preferably from 0.1 nm to 100 nm.

Thus, when the soft magnetic material of the present embodiment is used, a soft magnetic material having excellent characteristics particularly in terms of high magnetic permeability, low losses, and the like can be realized.

(Third Embodiment)

The soft magnetic material of the present embodiment is different from the soft magnetic material of the first or second embodiment from the viewpoint that the interposed phase 20 satisfies at least one of the following three conditions such as being a eutectic oxide, including a resin, and including at least one magnetic metal selected from Fe, Co and Ni. Here, any matters overlapping with the contents of the first or second embodiment will not be described repeatedly.

First, the first "case in which the interposed phase 20 is a eutectic oxide" will be explained. In this case, the interposed phase 20 includes a eutectic oxide including at least two secondary elements selected from the group consisting of B (boron), Si (silicon), Cr (chromium), Mo (molybdenum), Nb (niobium), Li (lithium), Ba (barium), Zn (zinc), La (lanthanum), P (phosphorus), Al (aluminum), Ge (germanium), W (tungsten), Na (sodium), Ti (titanium), As (arsenic), V (vanadium), Ca (calcium), Bi (bismuth), Pb (lead), Te (tellurium), and Sn (tin). Particularly, it is preferable that the interposed phase 20 includes a eutectic system including at least two elements among B, Bi, Si, Zn and Pb. As a result, the adhesiveness between the flattened magnetic metal particles and the interposed phase 20 becomes strong (adhesive strength increases), and the thermal stability or mechanical characteristics such as strength and toughness can be easily enhanced.

Furthermore, the eutectic oxide preferably has a softening point of from 200° C. to 600° C., and more preferably from 400° C. to 500° C. Even more preferably, the eutectic oxide is preferably a eutectic oxide including at least two elements among B, BI, Si, Zn and Pb, and having a softening point of from 400° C. to 500° C. As a result, the adhesiveness between the flattened magnetic metal particles 10 and the eutectic oxide becomes strong, and the thermal stability or mechanical characteristics such as strength and toughness are easily enhanced. When the flattened magnetic metal particles 10 are compacted with the eutectic oxide, the two components are compacted while performing a heat treatment at a temperature near the softening point of the eutectic oxide, and preferably a temperature slightly higher than the softening point. Then, the adhesiveness between the flattened magnetic metal particles 10 and the eutectic oxide is increased, and mechanical characteristics can be enhanced. Generally, as the temperature of the heat treatment is increased, the adhesiveness between the flattened magnetic metal particles 10 and the eutectic oxide is increased, and the mechanical characteristics are enhanced. However, if the temperature of the heat treatment is too high, the coefficient of thermal expansion may become large, and consequently, the adhesiveness between the flattened magnetic metal particles 10 and the eutectic oxide may be decreased on the contrary (if the difference between the coefficient of thermal expansion of the flattened magnetic metal particles 10 and the coefficient of thermal expansion of the eutectic oxide becomes large, the adhesiveness may be further decreased). Furthermore, in a case in which the flattened magnetic metal particles 10 is non-crystalline or amorphous, if the temperature of the heat treatment is high, crystallization proceeds, and coercivity increases. Therefore, it is not preferable. For this reason, in order to achieve a balance between the mechanical characteristics and the coercivity characteristics, it is preferable to adjust the softening point of the eutectic oxide to be from 200° C. to 600° C., and more preferably from 400° C. to 500° C., and to compact the flattened magnetic metal particles and the eutectic oxide while performing a heat treatment at a temperature near the softening point of the eutectic oxide, and preferably at a temperature slightly higher than the softening point. Furthermore, regarding the temperature at which the compacted material is actually used in a device or a system, it is preferable to use the integrated material at a temperature lower than the softening point.

Furthermore, it is preferable that the eutectic oxide has a glass transition temperature. Furthermore, it is desirable that the eutectic oxide has a coefficient of thermal expansion of from $0.5 \times 10^{-6}/°$ C. to $40 \times 10^{-6}/°$ C. As a result, the adhesiveness between the flattened magnetic metal particles 10 and the eutectic oxide becomes strong, and the thermal stability or the mechanical characteristics such as strength and toughness may be easily enhanced.

Furthermore, it is more preferable that the eutectic oxide includes at least one or more eutectic particles 22 that are in a particulate form (preferably a spherical form) having a particle size of from 10 nm to 10 μm. These eutectic particles 22 include the same material as the eutectic oxide that is not in a particulate form. In a soft magnetic material, pores may also exist partially, and thus, it can be easily observed that a portion of the eutectic oxide exists in a particulate form, and preferably in a spherical form. Even in a case in which there are no pores, the interface of the particulate form or spherical form can be easily discriminated. The particle size of the eutectic particles 22 is more preferably from 10 nm to 1 μm, and even more preferably from 10 nm to 100 nm. Thereby when stress is appropriately relieved during the heat treatment, the adhesiveness between the flattened magnetic metal particles can be retained, the strain applied to the flattened magnetic metal particles can be reduced, and coercivity can be reduced. As a result, the hysteresis loss can be also reduced, and the magnetic permeability can be increased. Meanwhile, the particle size of the eutectic particles 22 can be measured by an observation by TEM or SEM. FIG. 4 is a schematic diagram of the soft magnetic material 110 at this time. In FIG. 4, the interposed phase 20 fills in the space without any pores; however, in reality, pores may exist partially.

Furthermore, it is preferable that the interposed phase 20 includes intermediate interposed particles 24 including at least one element selected from the group consisting of O (oxygen), C (carbon), N (nitrogen) and F (fluorine), which has a softening point higher than that of the eutectic oxide of the interposed phase 20, more preferably has a softening point that is higher than 600° C. When the intermediate interposed particles 24 exist between the flattened magnetic metal particles 10, on the occasion in which the soft magnetic material 150 is exposed to high temperature, the flattened magnetic metal particles 10 are prevented to be thermally combined with each other and the deterioration of the characteristics can be prevented. That is, it is desirable that the intermediate interposed particles 24 exist mainly for the purpose of thermal stability. Furthermore, the softening point of the intermediate interposed particles 24 is higher than the softening point of the eutectic oxide, and more preferably, when the softening point is 600° C. or higher, thermal stability can be further increased.

It is preferable that the intermediate interposed particles 24 include at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and include at least one element selected from the group consisting of O (oxygen), C (carbon), N (nitrogen) and F (fluorine). More preferably, from the viewpoints of high oxidation resistance and high thermal stability, an oxide or composite oxide including oxygen is more preferred. Particularly, oxides such as aluminum oxide ($Al_2O_3$), silicon dioxide ($SiO_2$), titanium oxide ($TiO_2$), and zirconium oxide ($ZrO_2$); and composite oxides such as Al—Si—O are preferred from the viewpoint of high oxidation resistance and high thermal stability.

Figure 5B:
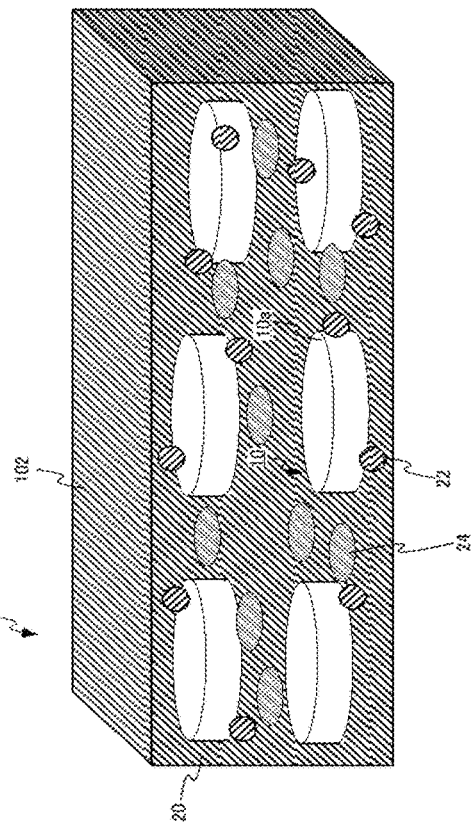
FIGS. 5A and 5B are schematic diagrams for a soft magnetic material according to a third embodiment having intermediately interposed particles.
Figure 5A:
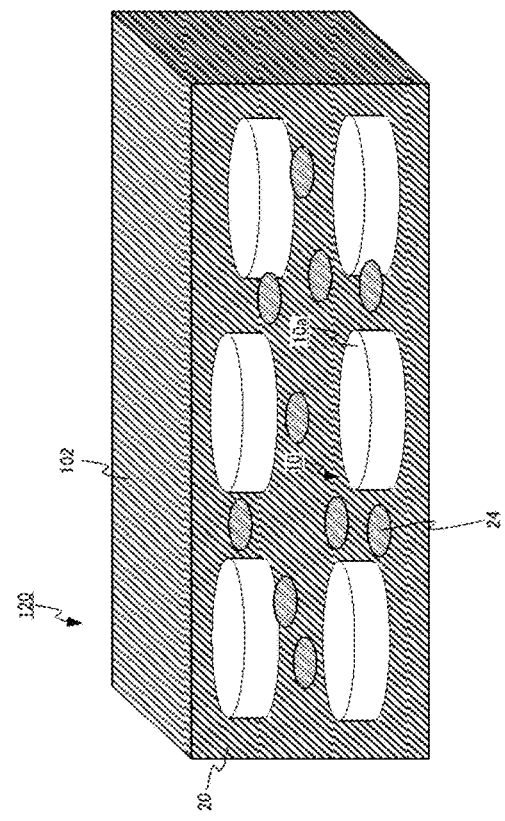

FIGS. 5A and 5B shows schematic diagrams of a soft magnetic material 120 and a soft magnetic material 130 including intermediate interposed particles 24. FIGS. 5A and 5B shows the case in which the interposed phase 20 does not include eutectic particles 22 (FIG. 5A), and the case in which the interposed phase 20 includes the eutectic particles 22 (FIG. 5B). In these diagrams, the interposed phase 20 fills in the space without any pores; however, the pores may exist partially.

Regarding the method for producing a soft magnetic material 120 and the soft magnetic material 130, both of which include intermediate interposed particles 24, for example, a method of mixing the flattened magnetic metal particles and the intermediate interposed particles (aluminum oxide ($Al_2O_3$) particles, silicon dioxide ($SiO_2$) particles, titanium oxide ($TiO_2$) particles, zirconium oxide ($ZrO_2$) particles, and the like) into a dispersed state using a ball mill or the like, and then compacting the flattened magnetic metal particles and the intermediate interposed particles by press molding or the like, may be used. The method of dispersing the particles is not particularly limited as long as it is a method capable of dispersing particles appropriately.

Next, the second "case in which the interposed phase 20 includes a resin" will be explained. In this case, the resin is not particularly limited; however, a polyester-based resin, a polyethylene-based resin, a polystyrene-based resin, a polyvinyl chloride-based resin, a polyvinyl butyral resin, a polyvinyl alcohol resin, a polybutadiene-based resin, a polytetrafluoroethylene ("TEFLON" (registered trademark))-based resin, a polyurethane resin, a cellulose-based resin, an ABS resin, a nitrile-butadiene-based rubber, a styrene-butadiene-based rubber, a silicone resin, other synthetic rubbers, natural rubber, an epoxy resin, a phenolic resin, an allyl resin, a polybenzimidazole resin, an amide-based resin, a polyimide-based resin, a polyamideimide resin, or copolymers thereof are used. Particularly, it is preferable that the interposed phase 20 includes a silicone resin or a polyimide resin, which are highly heat-resistant. As a result, the adhesiveness between the flattened magnetic metal particles and the interposed phase becomes strong, and the thermal stability or the mechanical characteristics such as strength and toughness can be easily enhanced.

Next, the third "case in which the interposed phase 20 includes at least one magnetic metal selected from Fe, Co and Ni and has magnetic properties" will be explained. In this case, it is preferable because, as the interposed phase has magnetic properties, the flattened magnetic metal particles 10 can readily interact magnetically, and the magnetic permeability is increased. Furthermore, since the magnetic domain structure is stabilized, the frequency characteristics of the magnetic permeability are also enhanced, which is preferable. Meanwhile, the term "magnetic properties" as used herein means ferromagnetism, ferrimagnetism, feeble magnetism, antiferromagnetism, or the like. Particularly, in the case of ferromagnetism and ferrimagnetism, the magnetic interaction is stronger, and it is preferable. In regard to the fact that the interposed phase 20 has magnetic properties, an evaluation can be performed using a VSM (Vibrating Sample Magnetometer) or the like. In regard to the fact that the interposed phase 20 includes at least one magnetic metal selected from Fe, Co and Ni and has magnetic properties, an investigation can be easily performed by using EDX or the like.

Thus, three embodiments of the interposed phase 20 have been described. It is preferable that at least one of these three conditions is satisfied, and it is still acceptable that two or more, or all of the three conditions be satisfied.

When the soft magnetic material of the present embodiment is used, a soft magnetic material having excellent characteristics particularly in terms of thermal stability, mechanical characteristics and the like can be realized.

(Fourth Embodiment)

The soft magnetic material 160 of the present embodiment is different from the soft magnetic materials of the first to third embodiments, in that the soft magnetic material has a laminated type structure including a magnetic layer 30 including flattened magnetic metal particles 10 and an intermediate layer 40 including any one of O, C and N. Here, any matters overlapping with the contents of the first to third embodiments will not be described repeatedly.

That is, the soft magnetic material 160 includes a magnetic layer including flattened magnetic metal particles including at least one magnetic metal selected from Fe, Co and Ni, the flattened magnetic metal particles having a thickness of from 10 nm to 100 µm, an aspect ratio of from 5 to 10,000, and a lattice strain of from 0.01% to 10%, in which the flattened magnetic metal particles are oriented and have unidirectional magnetic anisotropy in the aligned flattened surfaces, and an interposed phase 20 existing between the flattened magnetic metal particles and including at least one of oxygen (O), carbon (C), nitrogen (N) and fluorine (F); and an intermediate layer provided in contact with the magnetic layer and including any one of oxygen (O), carbon (C), nitrogen (N) and fluorine (F). At this time, it is preferable to adjust the magnetic permeability of the intermediate layer 40 to be smaller than the magnetic permeability of the magnetic layer 30. Through such a treatment, a pseudo thin film laminated structure can be realized, and the magnetic permeability in the layer direction can be made high, which is preferable. Furthermore, in regard to such a structure, since the ferromagnetic resonance frequency can be made high, the ferromagnetic resonance loss can be made small, which is preferable. Such a laminated structure is preferred because the magnetic domain structure is stabilized, and low magnetic losses can be realized. Furthermore, in order to further increase these effects, it is more preferable to make the magnetic permeability of the intermediate layer 40 to be smaller than the magnetic permeability of the interposed phase 20. As a result, in regard to the pseudo thin film laminated structure, the magnetic permeability in the layer direction can be further increased, which is preferable. Furthermore, since the ferromagnetic resonance frequency can be further increased, the ferromagnetic resonance loss can be made small, which is preferable. FIG. 6 is a schematic diagram of the soft magnetic material of the present embodiment.

Thus, when the soft magnetic material 160 of the present embodiment is used, a soft magnetic material having excellent characteristics particularly in terms of high magnetic permeability, low losses and the like can be realized.

(Fifth Embodiment)

Figure 7:
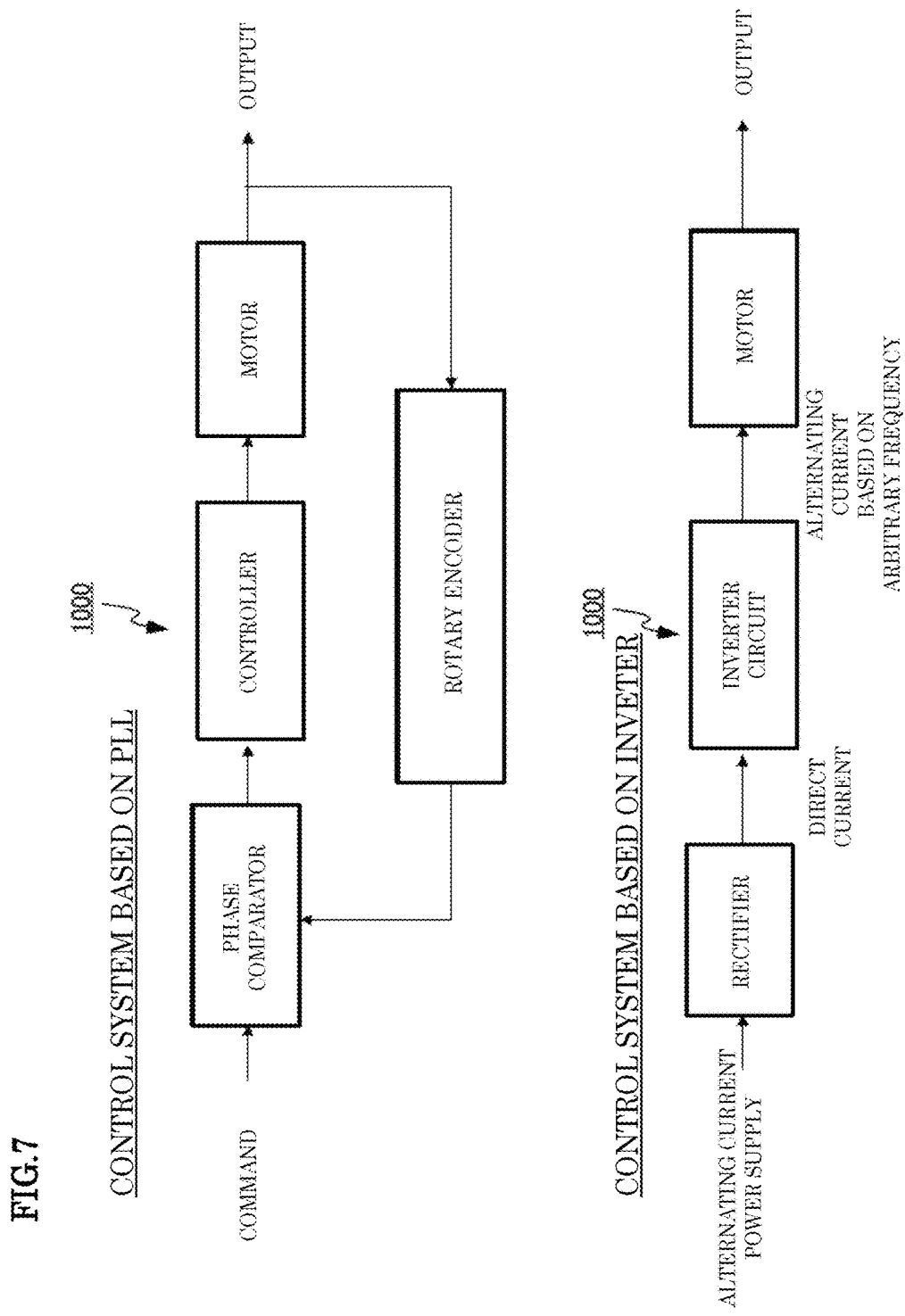
FIG. 7 is a conceptual diagram for a motor system according to a fifth embodiment.

The system and the device apparatus of the present embodiment have the soft magnetic materials of the first to fourth embodiments. Therefore, any matters overlapping with the contents of the first to fourth embodiments will not be described repeatedly. Examples of the component parts of the soft magnetic materials included in these system and device apparatus include cores for rotating electric machines such as various motors and generators (for example, motors and generators), potential transformers, inductors, transformers, choke coils and filters; magnetic wedges for rotating electric machines. FIG. 7 shows a conceptual diagram of a motor system 1000 as an example of the rotating electric machine system. A motor system is one system including a control system for controlling the rotational frequency or the electric power (output power) of a motor. Regarding the mode for controlling the rotational frequency of a motor, there are available control methods that are based on control by a bridge servo circuit, proportional current control, voltage comparison control, frequency synchronization control, and phase locked loop (PLL) control. As an example, a control method based on PLL is illustrated in FIG. 7. The motor system 1000 that controls the rotational frequency of a motor based on PLL includes a motor; a rotary encoder that converts the amount of mechanical displacement of the rotation of the motor to an electrical signal and detects the rotational frequency of the motor; a phase comparator that compares the rotational frequency of the motor given by a certain command and the rotational frequency of the motor detected by the rotary encoder and outputs the difference of those rotational frequencies; and a controller that controls the motor so as to make the relevant difference in the rotational frequencies small. On the other hand, examples of the method for controlling the electric power of the motor include control methods that are based on pulse width modulation (PWM) control, pulse amplitude modulation (PAM) control, vector control, pulse control, bipolar drive, pedestal control, and resistance control. Other examples of the control method include control methods based on microstep drive control, multiphase drive control, inverter control, and switching control. As an example, a control method using an inverter is illustrated in FIG. 7. A motor system 1000 that controls the electric power of the motor using an inverter includes an alternative current power supply; a rectifier that converts the output of the alternative power supply to a direct current; an inverter circuit that converts the relevant direct current to an alternating current by means of an arbitrary frequency; and a motor that is controlled by the relevant alternating current.

Figure 8:
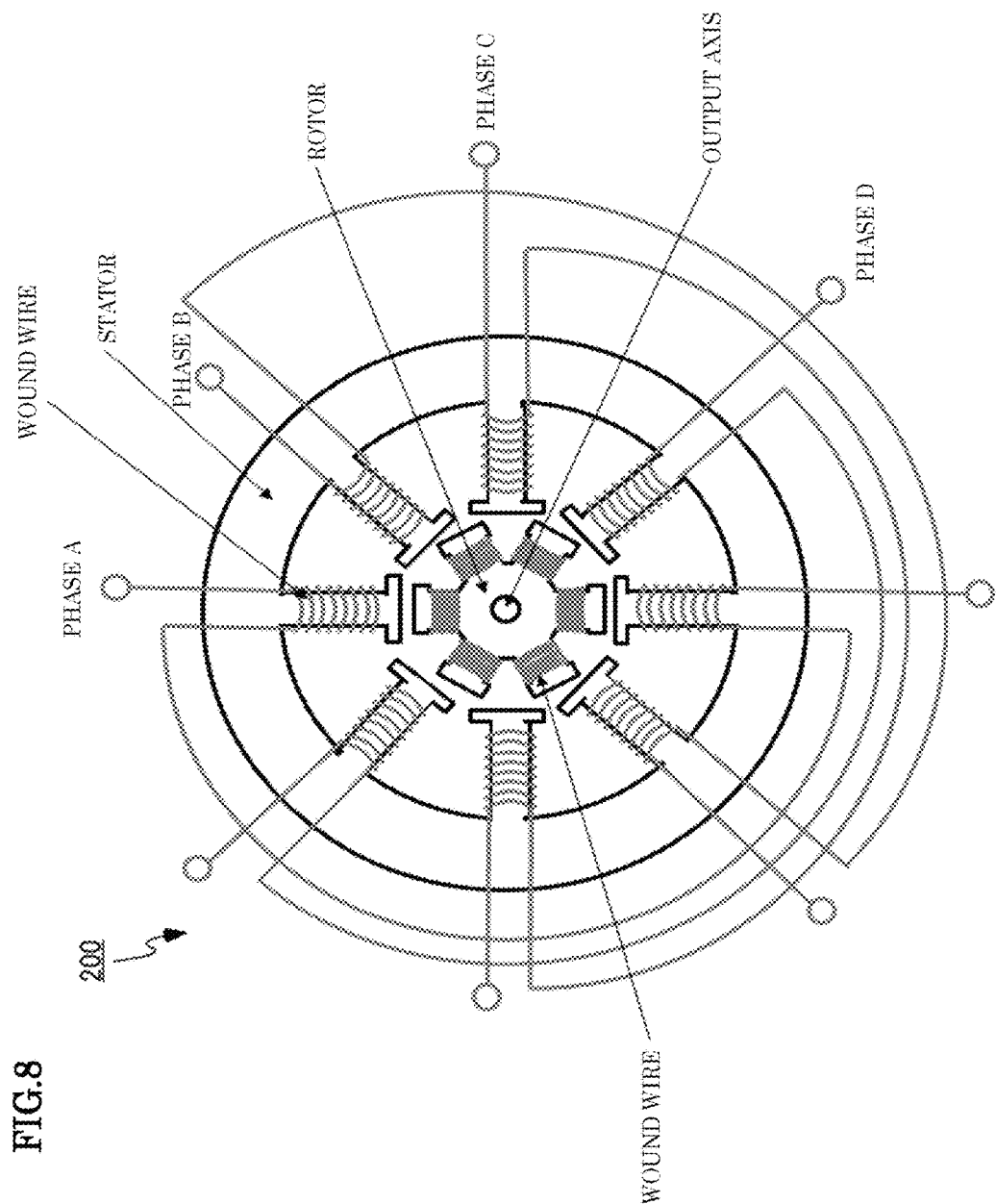
FIG. 8 is a conceptual diagram for a motor according to a fifth embodiment.

FIG. 8 shows a conceptual diagram of a motor 200 as an example of the rotating electric machine. In the motor 200, a first stator (stator) 210 and a second rotor (rotator) 220 are disposed. The diagram illustrates an inner rotor type motor in which a rotor is disposed inside a stator; however, the motor may also be of an outer rotor type in which the rotor is disposed outside the stator.

FIGS. 9A and 9B shows a conceptual diagram of a motor core. The cores of a stator and a rotor correspond to the motor core. This will be explained below using FIGS. 9A and 9B. FIG. 9A is a conceptual cross-sectional view diagram of the first stator 210. The first stator 210 has a core and coils. The coils are wound around some of the protrusions provided on the inner side of the core. In this core, the soft magnetic material of the first, second, third, or fourth embodiment can be disposed. FIG. 9B is a conceptual cross-sectional view diagram of the first rotor 220. The first rotor 220 has a core and coils. The coils are wound around some of the protrusions provided on the outer side of the core. In this core, the soft magnetic material of the first, second, third, or fourth embodiment can be disposed.

FIG. 8 and FIG. 9 are only for illustrative purposes to describe examples of motors, and the applications of the soft magnetic material are not limited to these. The soft magnetic material can be applied to all kinds of motors as cores for making it easy to guide the magnetic flux.

Figure 10:
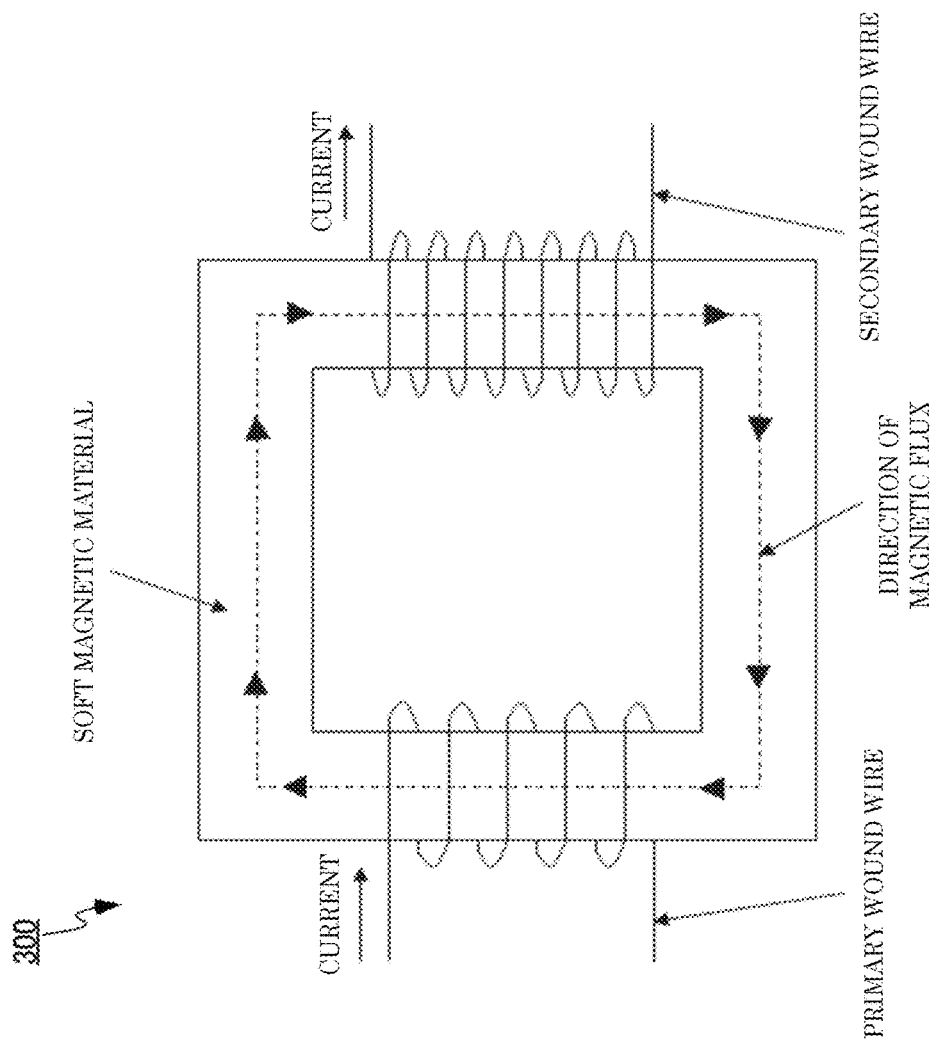
FIG. 10 is a diagram for a potential transformer/transformer according to the fifth embodiment.

Furthermore, a conceptual diagram of a potential transformer/transformer 300 is described in FIG. 10, and a conceptual diagram of an inductor is described in FIGS. 11A to D. These diagrams are only for illustrative purposes. Also for the potential transformer/transformer and the inductor, similarly to the motor core, soft magnetic materials can be applied to all kinds of potential transformers/transformers and inductors in order to make it easy to guide the magnetic flux or to utilize high magnetic permeability.

Figure 12:
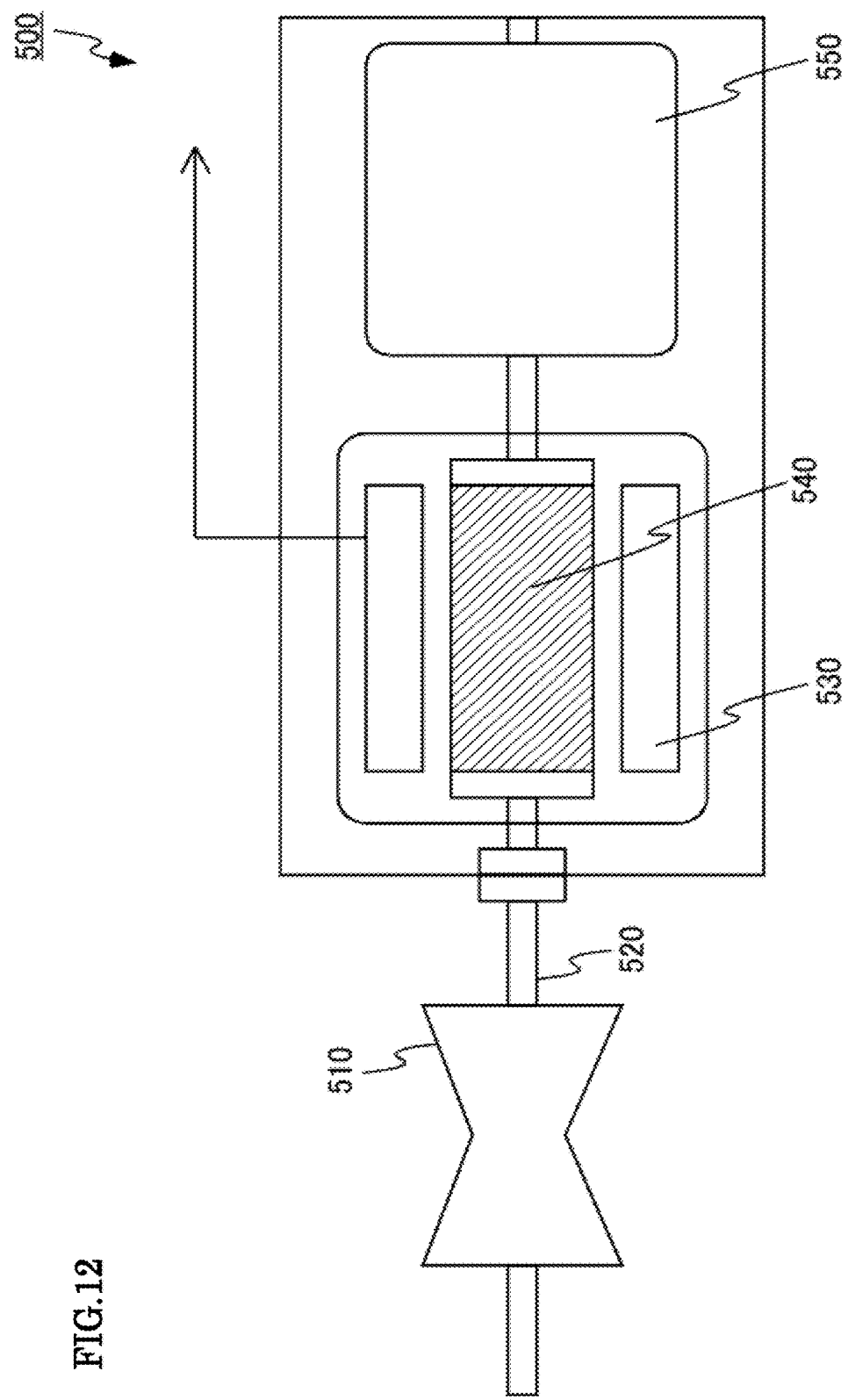
FIG. 12 is a conceptual diagram for a generator according to the fifth embodiment.

FIG. 12 shows a conceptual diagram of a generator 500 as an example of the rotating electric machine. The generator 500 includes any one of, or both of, a second stator (magneto stator) 530 that uses the soft magnetic material of the first, second, third, or fourth embodiment; and a second rotor (rotator) 540 that uses the soft magnetic material of the first, second, third, or fourth embodiment. In the diagram, the second rotor (rotator) 540 is disposed inside the second stator 530; however, the second rotor may also be disposed outside the second stator. The second rotor 540 is connected to a turbine 510 provided at an end of the generator 500 through a shaft 520. The turbine 510 is rotated by, for example, a fluid supplied from the outside, which is not shown in the diagram. Meanwhile, instead of the turbine 510 that is rotated by a fluid, the shaft 520 can also be rotated by transferring dynamic rotation of the regenerative energy of an automobile or the like. Various known configurations can be employed for the second stator 530 and the second rotor 540.

The shaft 520 is in contact with a commutator (not shown in the diagram) that is disposed on the opposite side of the turbine 510 with respect to the second rotor 540. The electromotive force generated by rotation of the second rotor 540 is transmitted, as the electric power of the generator 500, after undergoing a voltage increase to the system voltage through an isolated phase bus that is not shown in the diagram, and a main transformer that is not shown in the diagram. Meanwhile, in the second rotor 540, an electrostatic charge is generated due to an axial current caused by the static electricity and power generation from the turbine 510. Therefore, the generator 500 includes a brush 550 intended for discharging the electrostatic charge of the second rotor 540.

Figure 13:
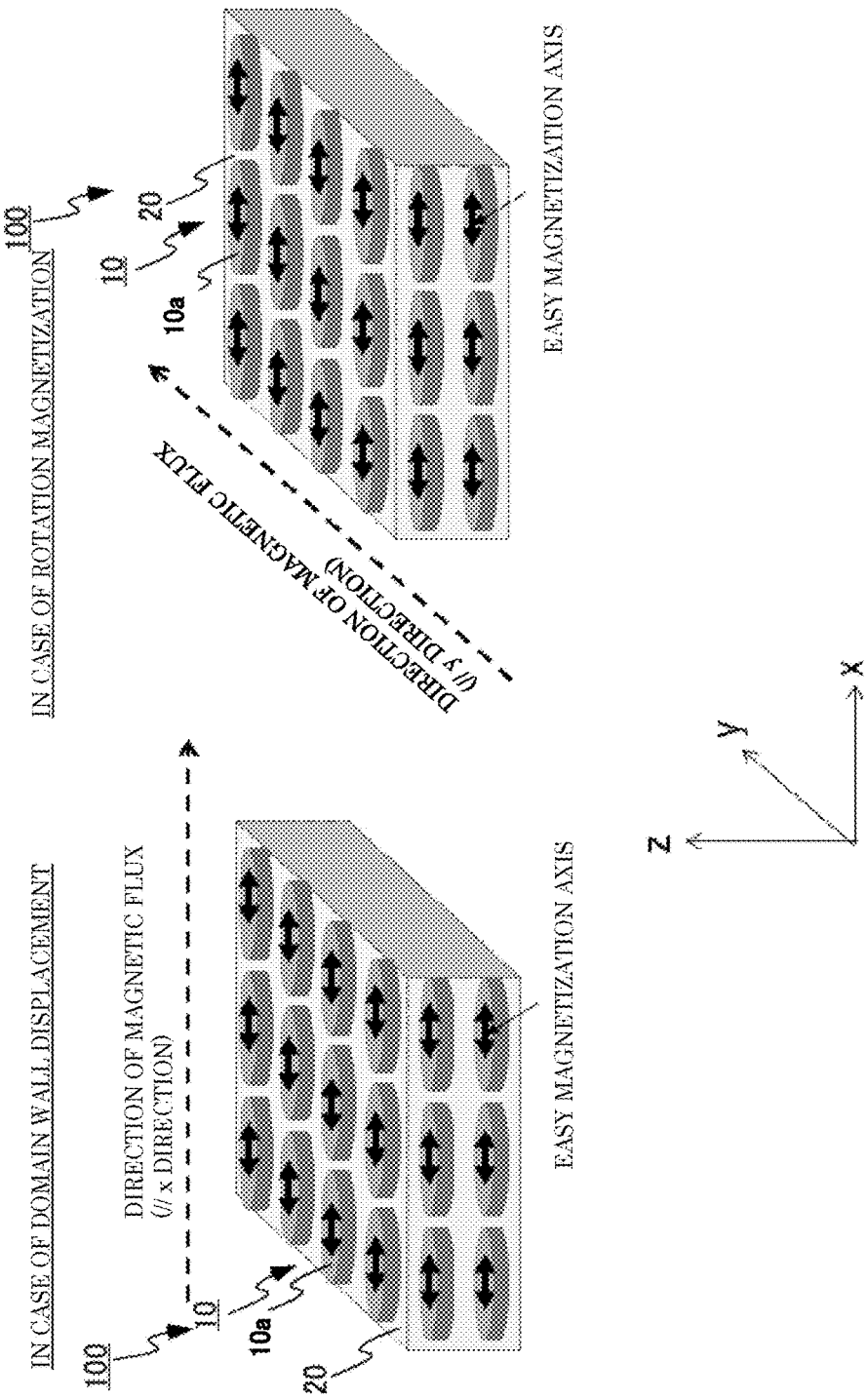
FIG. 13 is a conceptual diagram illustrating the relation between the direction of magnetic flux and the direction of disposition of a soft magnetic material.

Furthermore, FIG. 13 describes a preferred example of the relations between the direction of the magnetic flux and the direction of disposition of a soft magnetic material. First, for both of the domain wall displacement type and the rotation magnetization type, it is preferable that the flattened surfaces 10*a* of the flattened magnetic metal particles 10 included in the soft magnetic material are disposed in a direction that is aligned in parallel to the direction of magnetic flux as far as possible. This is because the eddy current loss can be reduced by making the cross-sectional area of the flattened magnetic metal particles 10 that penetrate the magnetic flux, as small as possible. Furthermore, in regard to the domain wall displacement type, it is preferable that the easy magnetization axis (direction of the arrow) within the flattened surface 10*a* of a flattened magnetic metal particle 10 is disposed in parallel to the direction of the magnetic flux. As a result, the system can be used in a direction in which coercivity is further reduced, and therefore, the hysteresis loss can be reduced, which is preferable. Furthermore, the magnetic permeability can also be made high, and it is preferable. On the contrary, in regard to the rotation magnetization type, it is preferable that the easy magnetization axis (direction of the arrow) within the flattened surface 10*a* of a flattened magnetic metal particle 10 is disposed perpendicularly to the direction of the magnetic flux. As a result, the system can be used in a direction in which coercivity is further reduced, and therefore, the hysteresis loss can be reduced, which is preferable. That is, it is preferable to understand the magnetization characteristics of a soft magnetic material, discriminate whether the soft magnetic material is of domain wall displacement type or rotation magnetization type (method for discrimination is as described above), and then dispose the soft magnetic material as shown in FIG. 13. In a case in which the direction of the magnetic flux is complicated, it may be difficult to dispose the soft magnetic material perfectly as shown in FIG. 13; however, it is preferable to dispose the soft magnetic material as shown in FIG. 13 as far as possible. It is desirable that the method for disposition described above is applied to all of the systems and device apparatuses (for example, cores for rotating electric machines such as various motors and generators (for example, motors and generators), potential transformers, inductors, transformers, choke coils, and filters; and magnetic wedges for rotating electric machines) of the present embodiment.

In order for the soft magnetic material to be applied to these systems and device apparatuses, the soft magnetic material is allowed to be subjected to various kinds of processing. For example, in the case of a sintered body, the soft magnetic material is subjected to mechanical processing such as polishing or cutting; in the case of a powder, mixing with a resin such as an epoxy resin or a polybutadiene is carried out. If necessary, a surface treatment is carried out. Also, if necessary, a coil-winding treatment is carried out.

When the system and device apparatus of the present embodiment are used, a motor system, a motor, a potential transformer, a transformer, an inductor and a generator, all having excellent characteristics (high efficiency and low losses), can be realized.

EXAMPLES

Hereinafter, Examples 1 to 13 of the present invention will be described in more detail, by making comparisons with Comparative Examples 1 to 7. In regard to the soft magnetic materials 100 of Examples and Comparative Examples described below, the thickness and aspect ratio of the flattened magnetic metal particles 10, magnetization behavior, lattice strain, the proportion of difference in lattice spacings, crystal structure, and composition are indicated in Table 1. Meanwhile, measurement of the thickness and the aspect ratio of the flattened magnetic metal particles 10 is based on TEM observations and SEM observations, and are calculated as the average values of a large number of particles. Meanwhile, in regard to the composition, a comprehensive determination is made using EDX and ICP. The lattice strain and the proportion of difference between lattice springs are analyzed by XRD.

Example 1

First, a ribbon of Fe—Co—Si—B (Fe:Co=70:30 at %) is produced using a single roll cooling apparatus. Next, this ribbon is cut into an appropriate size using a mixing apparatus. Subsequently, cut ribbon pieces are collected and subjected to pulverization and rolling at 1,000 rpm in an Ar atmosphere using a planetary mill using $ZrO_2$ balls and a $ZrO_2$ container. The cutting, pulverization and rolling as described above are repeated, and a treatment is carried out so that flattened magnetic metal particles 10 having a thickness of 10 nm and an aspect ratio of 1,000 are obtained. Furthermore, the surface of the flattened magnetic metal particles 10 thus obtained is coated with a non-magnetic $SiO_2$ layer having a thickness of 20 nm by a sol-gel method, and subsequently, the flattened magnetic metal particles 10 are mixed with an inorganic oxide (corresponding to the interposed phase 20; $B_2O_3$—$Bi_2O_3$—ZnO: softening point 425° C.). Subsequently, molding is performed in a magnetic field (to align the flattened magnetic metal particles 10), and the mixture is subjected to a heat treatment. The heat treatment is performed at a temperature slightly higher than the softening point. Thus, a soft magnetic material 100 is obtained. Finally, the flattened magnetic metal particles are subjected to a heat treatment while a magnetic field is applied in one direction within the flattened surface 10$a$, the lattice strain is adjusted to be about 0.1%, and the proportion of the difference between the maximum value and the minimum value of the lattice spacing in plane is adjusted to be about 0.1%. The soft magnetic material 100 thus obtained includes flattened magnetic metal particles 10 that are oriented with magnetic anisotropy in one direction within the flattened surface 10$a$.

Example 2

A soft magnetic material is obtained in an almost the same manner as in Example 1, except that the thickness of the flattened magnetic metal particles 10 is adjusted to 100 μm, and the aspect ratio is adjusted to 5.

Example 3

A soft magnetic material is produced in an almost the same manner as in Example 1, except that the aspect ratio of the flattened magnetic metal particles 10 is adjusted to 5.

Example 4

A soft magnetic material is produced in an almost the same manner as in Example 1, except that the aspect ratio of the flattened magnetic metal particles 10 is adjusted to 100.

Example 5

A soft magnetic material is produced in an almost the same manner as in Example 1, except that the aspect ratio of the flattened magnetic metal particles 10 is adjusted to 10,000. At this time, the magnetization behavior is changed from the domain wall displacement type to the rotation magnetization type.

Example 6

A soft magnetic material is produced in an almost the same manner as in Example 1, except that the lattice strain of the flattened magnetic metal particles 10 is adjusted to be about 0.01%, and the proportion of the difference in the lattice spacing is adjusted to be about 0.01%.

Example 7

A soft magnetic material is produced in an almost the same manner as in Example 1, except that the lattice strain of the flattened magnetic metal particles 10 is adjusted to be about 0.5%, and the proportion of the difference in the lattice spacing is adjusted to be about 0.5%.

Example 8

A soft magnetic material is obtained in an almost the same manner as in Example 1, except that the composition ratio of Fe:Co of the flattened magnetic metal particles 10 is adjusted to 10:90. At this time, the crystal structure becomes a fcc structure (In the Example 1, the crystal structure becomes a bcc structure).

Example 9

A soft magnetic material is obtained in an almost the same manner as in Example 1, except that the composition of the flattened magnetic metal particles 10 is changed to Fe—Ni—Si—B (Fe:Ni=50:50 at %). At this time, the crystal structure becomes a fcc structure.

Example 10

A soft magnetic material is obtained in an almost the same manner as in Example 1, except that the composition ratio of Fe:Co of the flattened magnetic metal particles 10 is adjusted to 28:72. At this time, the crystal structure becomes a mixed phase of a bcc structure and a fcc structure.

Example 11

A soft magnetic material is produced in an almost the same manner as in Example 1, except that the flattened magnetic metal particles 10 are subjected to a heat treatment at 500° C. in a magnetic field of 20 kOe, so that the crystallites of the flattened magnetic metal particles 10 are aligned in a rod shape by being linked in a row, and the flattened magnetic metal particles 10 are oriented in one direction within the flattened surface 10*a*.

Example 12

A soft magnetic material is produced in an almost the same manner as in Example 1, except that the flattened magnetic metal particles 10 are oriented in the (110)[111] direction.

Example 13

A soft magnetic material is produced in an almost the same manner as in Example 1, except that the lattice mismatching between the flattened magnetic metal particles 10 and the interposed phase 20 is adjusted to 10%.

Example 14

A soft magnetic material is produced in an almost the same manner as in Example 1, except that the thickness at the time of molding is adjusted to about 100 μm, and a laminated structure with a non-magnetic layer of $SiO_2$ (intermediate layer 40) is produced.

Comparative Example 1

Spherical particles of Fe—Co—Si—B (Fe:Co=70:30 at %; the composition is the same as that of Example 1) are produced using an atomization method. The spherical particles thus obtained are mixed with an inorganic substance (corresponding to the interposed phase 20), and the mixture is molded. Finally, the molded product is subjected to a heat treatment, and thereby the lattice strain and the proportion of the difference in the lattice spacing are both adjusted to be almost 0%.

Comparative Example 2

A soft magnetic material is produced in an almost the same manner as in Example 1, except that the thickness of the flattened magnetic metal particles 10 is adjusted to 8 nm.

Comparative Example 3

A soft magnetic material is produced in an almost the same manner as in Example 1, except that the thickness of the flattened magnetic metal particles 10 is adjusted to 120 μm, and the aspect ratio is adjusted to 5.

Comparative Example 4

A soft magnetic material is produced in an almost the same manner as in Example 1, except that the aspect ratio of the flattened magnetic metal particles 10 is adjusted to 4.

Comparative Example 5

A soft magnetic material is produced in an almost the same manner as in Example 1, except that the aspect ratio of the flattened magnetic metal particles 10 is adjusted to 12,000.

Comparative Example 6

A soft magnetic material is produced in an almost the same manner as in Example 1, except that the lattice strain of the flattened magnetic metal particles 10 is adjusted to be about 0.007%, and the proportion of the difference in the lattice spacing is adjusted to be about 0.006%.

Comparative Example 7

A soft magnetic material is produced in an almost the same manner as in Example 1, except that the lattice strain of the flattened magnetic metal particles 10 is adjusted to be about 10.1%, and the proportion of the difference in the lattice spacing is adjusted to be about 10.2%.

Next, in regard to the materials for evaluation of Examples 1 to 13 and Comparative Examples 1 to 7, the saturation magnetization, the real part of magnetic permeability (μ'), magnetic permeability loss (tan δ), the change over time in the real part of the magnetic permeability (μ') after 100 hours, core loss, and the strength ratio are evaluated by the following methods. The evaluation results are presented in Table 2.

(1) Saturation magnetization: The saturation magnetization at room temperature is measured using a vibrating sample magnetometer (VSM).

(2) Real part of magnetic permeability μ' and magnetic permeability loss (tan δ=μ"/μ'×100(%)): The magnetic permeability of a ring-shaped sample is measured using an impedance analyzer. The real part μ' and the imaginary part μ" at a frequency of 1 kHz are measured. Furthermore, the magnetic permeability loss tan δ is calculated by the formula: μ"/μ'×100(%).

(3) Change over time of real part of magnetic permeability μ' after 100 hours: A sample for evaluation is heated at a temperature of 60° C. in air for 100 hours, and then the real part of the magnetic permeability μ' is measured again. Thus, the change over time (real part of magnetic permeability μ' after standing for 100 hours/real part of magnetic permeability μ' before standing) is determined.

(4) Core loss: The core loss under the operating conditions of 1 kHz and 1 T is measured using a B-H analyzer.

(5) Strength ratio: The flexural strength of a sample for evaluation is measured, and this is represented by the ratio with respect to the flexural strength of a comparative sample (=flexural strength of the evaluated sample/flexural strength of comparative sample). Furthermore, the strength ratios of Examples and Comparative Examples 2 to 7 are presented as ratios with respect to Comparative Example 1.

TABLE 1

| | Thickness | Aspect ratio | Magnetization behavior | Lattice strain (%) | Proportion of difference in lattice spacing (%) | Crystal Structure | Composition | Remarks |
|---|---|---|---|---|---|---|---|---|
| Example 1 | 10 nm | 1000 | Domain wall Displacement | 0.11 | 0.10 | Bcc | FeCo-based | — |
| Example 2 | 100 μm | 5 | Domain wall Displacement | 0.12 | 0.11 | Bcc | FeCo-based | — |
| Example 3 | 10 nm | 5 | Domain wall Displacement | 0.11 | 0.10 | Bcc | FeCo-based | — |
| Example 4 | 10 nm | 100 | Domain wall Displacement | 0.12 | 0.11 | Bcc | FeCo-based | — |
| Example 5 | 10 nm | 10000 | Rotation magnetization | 0.10 | 0.10 | Bcc | FeCo-based | — |
| Example 6 | 10 nm | 1000 | Domain wall displacement | 0.01 | 0.01 | Bcc | FeCo-based | — |
| Example 7 | 10 nm | 1000 | Domain wall displacement | 0.5 | 0.48 | Bcc | FeCo-based | — |
| Example 8 | 10 nm | 1000 | Domain wall displacement | 0.11 | 0.10 | Fcc | FeCo-based | — |
| Example 9 | 10 nm | 1000 | Domain wall displacement | 0.10 | 0.11 | Fcc | FeNi-based | — |
| Example 10 | 10 nm | 1000 | Domain wall displacement | 0.3 | 0.2 | Bcc + Fcc | FeCo-based | — |
| Example 11 | 10 nm | 1000 | Domain wall displacement | 0.15 | 0.13 | Bcc | FeCo-based | Crystallites are oriented in a rod shape |
| Example 12 | 10 nm | 1000 | Domain wall displacement | 0.11 | 0.10 | Bcc | FeCo-based | (110) [111] orientation |
| Example 13 | 10 nm | 1000 | Domain wall displacement | 0.15 | 0.14 | Bcc | FeCo-based | Interposed phase lattice mismatch |
| Example 14 | 10 nm | 1000 | Domain wall displacement | 0.16 | 0.13 | Bcc | FeCo-based | Luminated structure |
| Comparative Example 1 | 50 μm | 1 | Domain wall displacement | ≈0 | ≈0 | Bcc | FeCo-based | — |
| Comparative Example 2 | 8 nm | 1000 | Domain wall displacement | 0.12 | 0.10 | Bcc | FeCo-based | — |
| Comparative Example 3 | 120 μm | 5 | Domain wall displacement | 0.10 | 0.10 | Bcc | FeCo-based | — |
| Comparative Example 4 | 10 nm | 4 | Domain wall displacement | 0.11 | 0.11 | Bcc | FeCo-based | — |
| Comparative Example 5 | 10 nm | 12000 | Rotation magnetization | 0.10 | 0.11 | Bcc | FeCo-based | — |
| Comparative Example 6 | 10 nm | 1000 | Domain wall displacement | 0.007 | 0.006 | Bcc | FeCo-based | — |
| Comparative Example 7 | 10 nm | 1000 | Domain wall displacement | 10.1 | 10.2 | Bcc | FeCo-based | — |

TABLE 2

| | Saturation magnetization | μ' (1 kHz) | tan δ (%) (1 kHz) | Core loss (kW/m³) | Proportion of change over time in μ' (%) | Strength ratio |
|---|---|---|---|---|---|---|
| Example 1 | 1.8 | 150 | ≈0 | 700 | 92 | 1.2 |
| Example 2 | 1.8 | 80 | ≈0 | 760 | 93 | 1.2 |
| Example 3 | 1.8 | 70 | ≈0 | 640 | 92 | 1.3 |
| Example 4 | 1.8 | 90 | ≈0 | 650 | 93 | 1.2 |
| Example 5 | 1.8 | 50 | ≈0 | 550 | 93 | 1.2 |
| Example 6 | 1.8 | 160 | ≈0 | 700 | 92 | 1.2 |
| Example 7 | 1.8 | 170 | ≈0 | 700 | 92 | 1.2 |
| Example 8 | 1.3 | 160 | ≈0 | 740 | 93 | 1.3 |
| Example 9 | 1.1 | 170 | ≈0 | 760 | 93 | 1.2 |
| Example 10 | 1.5 | 160 | ≈0 | 660 | 92 | 1.3 |
| Example 11 | 1.8 | 180 | ≈0 | 580 | 93 | 1.3 |
| Example 12 | 1.8 | 180 | ≈0 | 600 | 92 | 1.2 |
| Example 13 | 1.8 | 160 | ≈0 | 600 | 93 | 1.3 |
| Example 14 | 1.4 | 180 | ≈0 | 580 | 92 | 1.2 |
| Comparative Example 1 | 1.8 | 50 | 10 | 1000 | 86 | — |
| Comparative Example 2 | 1.8 | 155 | ≈0 | 820 | 86 | 1.1 |
| Comparative Example 3 | 1.8 | 60 | ≈0 | 10000 | 89 | 1.1 |
| Comparative Example 4 | 1.8 | 55 | ≈0 | 800 | 89 | 1.1 |

TABLE 2-continued

|  | Saturation magnetization | μ' (1 kHz) | tan δ (%) (1 kHz) | Core loss (kW/m³) | Proportion of change over time in μ' (%) | Strength ratio |
|---|---|---|---|---|---|---|
| Comparative Example 5 | 1.8 | 40 | ≈0 | 800 | 88 | 1.1 |
| Comparative Example 6 | 1.8 | 140 | ≈0 | 820 | 89 | 1.1 |
| Comparative Example 7 | 1.8 | 135 | ≈0 | 820 | 88 | 1.1 |

As is obvious from Table 1, the soft magnetic materials 100 related to Examples 1 to 14 are soft magnetic materials 100 composed of flattened magnetic metal particles 10 having a thickness of from 10 nm to 100 μm and an aspect ratio of from 5 to 10,000, and an oxide interposed phase 20. Furthermore, in all of the soft magnetic materials, the flattened magnetic metal particle 10 is oriented with magnetic anisotropy in one direction within aligned flattened surface 10a. In Example 5, magnetization proceeds by rotation magnetization, while in the other Examples, magnetization proceeds by domain wall displacement. Furthermore, the lattice strain of the flattened magnetic metal particles 10 is from 0.01% to 10%. Furthermore, the lattice spacing in the flattened surface 10a of the flattened magnetic metal particles varies with direction, and the proportion of the difference between the maximum lattice spacing and the minimum lattice spacing is from 0.01% to 10%. In Example 11, the flattened surfaces 10a of the flattened magnetic metal particles 10 are oriented in the (110)[111] direction. Examples 8 and 9 have a fcc crystal structure, and Example 10 has a crystal structure of a mixed phase of fcc and bcc. The other Examples have a bcc crystal structure. In Example 13, the lattice mismatching between the flattened magnetic metal particles 10 and the interposed phase 20 is 10%. Example 14 has a laminated structure with a non-magnetic layer.

On the other hand, Comparative Example 1 is a pressed powder of spherical isotropic particles obtained by atomization, which is an existing technology. Comparative Examples 2 to 7 are not included in the scope of the claims, compared to Example 1.

As is obvious from Table 2, it is understood that the soft magnetic materials 100 related to Examples 1 to 14 are superior to the existing material of Comparative Example 1, in terms of the real part of magnetic permeability, magnetic permeability loss, core loss, proportion of change over time in magnetic permeability, and strength ratio. Furthermore, it is understood that the soft magnetic materials 100 of Examples 1 to 14 are superior to the materials of Comparative Examples 2 to 7, particularly in terms of the real part of magnetic permeability, core loss, proportion of change over time in magnetic permeability, and strength ratio. Furthermore, since the saturation magnetization is determined by the composition, a large difference is not observed compared to Comparative Examples as long as the materials have the same composition.

Thus, it is understood that the soft magnetic materials 100 related to Examples 1 to 14 are soft magnetic pressed powder materials that satisfy the conditions of high saturation magnetization, high magnetic permeability, low losses, high thermal stability, high oxidation resistance, and high strength, and can be applied to complicated shapes.

Example 15

A soft magnetic material is produced in an almost the same manner as in Example 2, except that the thickness is 100 nm.

Example 16

A sot magnetic material is produced in an almost the same manner as in Example 2, except that the thickness is 1 μm.

Example 17

A soft magnetic material is produced in an almost the same manner as in Example 2, except that the thickness is 10 μm.

Example 18

A soft magnetic material is produced in an almost the same manner as in Example 1, except that the lattice strain of the flattened magnetic metal particles 10 is adjusted to be about 0.9%, and the proportion of the difference in the lattice spacing is adjusted to be about 0.92%.

Example 19

A soft magnetic material is produced in an almost the same manner as in Example 1, except that the lattice strain of the flattened magnetic metal particles 10 is adjusted to be about 4.8%, and the proportion of the difference in the lattice spacing is adjusted to be about 4.9%.

Example 20

A soft magnetic material is produced in an almost the same manner as in Example 1, except that the lattice strain of the flattened magnetic metal particles 10 is adjusted to be about 9.7%, and the proportion of the difference in the lattice spacing is adjusted to be about 9.9%.

Example 21

A soft magnetic material is produced in an almost the same manner as in Example 1, except that the surface of flattened magnetic metal particles 10 having a thickness of 10 nm and an aspect ratio of 1,000 is coated with a non-magnetic $SiO_2$ layer having a thickness of 1 nm by a sol-gel method.

Example 22

A soft magnetic material is produced in an almost the same manner as in Example 1, except that the surface of flattened magnetic metal particles 10 having a thickness of 100 nm and an aspect ratio of 100 is coated with a non-magnetic $SiO_2$ layer having a thickness of 10 nm by a sol-gel method.

Example 23

A soft magnetic material is produced in an almost the same manner as in Example 1, except that the surface of flattened magnetic metal particles 10 having a thickness of 1 m and an aspect ratio of 100 is coated with a non-magnetic $SiO_2$ layer having a thickness of 100 nm by a sol-gel method.

Example 24

A soft magnetic material is produced in an almost the same manner as in Example 1, except that the surface of flattened magnetic metal particles 10 having a thickness of 10 μm and an aspect ratio of 10 is coated with a non-magnetic $SiO_2$ layer having a thickness of 900 nm by a sol-gel method.

Example 25

The soft magnetic material of the present Example is almost the same as the material of Example 1, except that the soft magnetic material has a eutectic system having a softening point of 200° C. The composition of the eutectic system is P—V—Ag—O.

Example 26

The soft magnetic material of the present Example is almost the same as the material of Example 1, except that the soft magnetic material has a eutectic system having a softening point of 300° C. The composition of the eutectic system is Pb—B—O.

Example 27

The soft magnetic material of the present Example is almost the same as the material of Example 1, except that the soft magnetic material has a eutectic system having a softening point of 400° C. The composition of the eutectic system is Bi—B—O.

Example 28

The soft magnetic material of the present Example is almost the same as the material of Example 1, except that the soft magnetic material has a eutectic system having a softening point of 500° C. The composition of the eutectic system is B—Bi—Zn—O.

Example 29

The soft magnetic material of the present Example is almost the same as the material of Example 1, except that the soft magnetic material has a eutectic system having a softening point of 600° C. The composition of the eutectic system is B—Bi—Si—O.

Example 30

The soft magnetic material of the present Example is almost the same as the material of Example 1, except that spherical eutectic particles having a particle size of 50 nm are produced on the surface of the flattened magnetic metal particles by lengthening the heat treatment time to two times during the heat treatment after molding in a magnetic field. The composition of the eutectic particles is B—Bi—Zn—O.

Comparative Example 8

A soft magnetic material is produced in an almost the same manner as in Example 1, except that the surface of flattened magnetic metal particles having a thickness of 10 nm and an aspect ratio of 1,000 is not coated with a non-magnetic $SiO_2$ layer.

Comparative Example 9

A soft magnetic material is produced in an almost the same manner as in Example 1, except that the surface of flattened magnetic metal particles 10 having a thickness of 10 μm and an aspect ratio of 10 is coated with a non-magnetic $SiO_2$ layer having a thickness of 2 μm by a sol-gel method.

Comparative Example 10

A soft magnetic material is produced in an almost the same manner as in Example 1, except that the soft magnetic material has an interposed phase having a softening point of 100° C. For the interposed phase, an organic epoxy resin was used.

Comparative Example 11

A soft magnetic material is produced in an almost the same manner as in Example 1, except that the soft magnetic material has a eutectic system having a softening point of 700° C. The composition of the eutectic system is Si—B—Al—O.

TABLE 3

| | Thickness | Aspect ratio | Magnetization behavior | Lattice strain (%) | Proportion of difference in lattice spacing (%) | Crystal Structure | Composition | Remarks |
|---|---|---|---|---|---|---|---|---|
| Example 15 | 100 nm | 5 | Domain wall displacement | 0.11 | 0.10 | Bcc | FeCo-Based | — |
| Example 16 | 1 μm | 5 | Domain wall displacement | 0.12 | 0.11 | Bcc | FeCo-Based | — |
| Example 17 | 10 μm | 5 | Domain wall displacement | 0.11 | 0.10 | Bcc | FeCo-Based | — |
| Example 18 | 10 nm | 1000 | Domain wall displacement | 0.9 | 0.92 | Bcc | FeCo-Based | — |

TABLE 3-continued

| | Thickness | Aspect ratio | Magnetization behavior | Lattice strain (%) | Proportion of difference in lattice spacing (%) | Crystal Structure | Composition | Remarks |
|---|---|---|---|---|---|---|---|---|
| Example 19 | 10 nm | 1000 | Domain wall displacement | 4.8 | 4.9 | Bcc | FeCo-Based | — |
| Example 20 | 10 nm | 1000 | Domain wall displacement | 9.7 | 9.9 | Bcc | FeCo-Based | — |
| Example 21 | 10 nm | 1000 | Domain wall displacement | 0.11 | 0.10 | Bcc | FeCo-Based | Thickness of SiO₂ coating layer is 1 nm |
| Example 22 | 100 nm | 100 | Domain wall displacement | 0.11 | 0.10 | Bcc | FeCo-Based | Thickness of SiO₂ coating layer is 10 nm |
| Example 23 | 1 μm | 100 | Domain wall displacement | 0.11 | 0.10 | Bcc | FeCo-Based | Thickness of SiO₂ coating layer is 100 nm |
| Example 24 | 10 μm | 10 | Domain wall displacement | 0.11 | 0.10 | Bcc | FeCo-Based | Thickness of SiO₂ coating layer is 900 nm |
| Example 25 | 10 nm | 1000 | Domain wall displacement | 0.11 | 0.10 | Bcc | FeCo-Based | Softening point of interposed phase is 200° C. |
| Example 26 | 10 nm | 1000 | Domain wall displacement | 0.11 | 0.10 | Bcc | FeCo-Based | Softening point of interposed phase is 300° C. |
| Example 27 | 10 nm | 1000 | Domain wall displacement | 0.11 | 0.10 | Bcc | FeCo-Based | Softening point of interposed phase is 400° C. |
| Example 28 | 10 nm | 1000 | Domain wall displacement | 0.11 | 0.10 | Bcc | FeCo-Based | Softening point of interposed phase is 500° C. |
| Example 29 | 10 nm | 1000 | Domain wall displacement | 0.11 | 0.10 | Bcc | FeCo-Based | Softening point of interposed phase is 600° C. |
| Example 30 | 10 nm | 1000 | Domain wall displacement | 0.11 | 0.10 | Bcc | FeCo-Based | Spherical eutectic particles |
| Comparative Example 8 | 10 nm | 1000 | Domain wall displacement | 0.11 | 0.10 | Bcc | FeCo-Based | No coating layer |
| Comparative Example 9 | 10 μm | 10 | Domain wall displacement | 0.11 | 0.10 | Bcc | FeCo-Based | Thickness of SiO₂ coating layer is 2 um |
| Comparative Example 10 | 10 nm | 1000 | Domain wall displacement | 0.11 | 0.10 | Bcc | FeCo-Based | Softening point of interposed phase is 100° C. |
| Comparative Example 11 | 10 nm | 1000 | Domain wall displacement | 0.11 | 0.10 | Bcc | FeCo-based | Softening point of interposed phase is 700° C. |

TABLE 4

| | Saturation magnetization (T) | μ' (1 kHz) | tan δ (%) (1 kHz) | Core loss (kW/m³) | Proportion of change over time in μ' (%) | Strength ratio |
|---|---|---|---|---|---|---|
| Example 15 | 1.8 | 80 | ≈0 | 660 | 92 | 1.2 |
| Example 16 | 1.8 | 85 | ≈0 | 680 | 93 | 1.3 |
| Example 17 | 1.8 | 90 | ≈0 | 690 | 92 | 1.3 |
| Example 18 | 1.8 | 150 | ≈0 | 650 | 93 | 1.2 |
| Example 19 | 1.8 | 145 | ≈0 | 680 | 93 | 1.2 |
| Example 20 | 1.8 | 140 | ≈0 | 700 | 92 | 1.2 |
| Example 21 | 1.8 | 160 | ≈0 | 700 | 92 | 1.2 |
| Example 22 | 1.8 | 140 | ≈0 | 710 | 93 | 1.3 |
| Example 23 | 1.8 | 130 | ≈0 | 720 | 93 | 1.3 |
| Example 24 | 1.7 | 80 | ≈0 | 740 | 93 | 1.3 |
| Example 25 | 1.8 | 140 | ≈0 | 700 | 93 | 1.3 |
| Example 26 | 1.8 | 150 | ≈0 | 700 | 93 | 1.3 |
| Example 27 | 1.8 | 160 | ≈0 | 680 | 93 | 1.3 |
| Example 28 | 1.8 | 160 | ≈0 | 680 | 93 | 1.3 |
| Example 29 | 1.8 | 150 | ≈0 | 700 | 93 | 1.3 |
| Example 30 | 1.8 | 165 | ≈0 | 660 | 93 | 1.3 |
| Comparative Example 8 | 1.8 | 130 | ≈0 | 850 | 89 | 1.1 |
| Comparative Example 9 | 1.5 | 60 | ≈0 | 900 | 88 | 1.1 |
| Comparative Example 10 | 1.8 | 100 | ≈0 | 900 | 89 | 1.1 |
| Comparative Example 11 | 1.8 | 90 | ≈0 | 1000 | 89 | 1.1 |

As is obvious from Table 3, the soft magnetic materials related to Examples 15 to 30 are soft magnetic materials composed of flattened magnetic metal particles having a thickness of from 10 nm to 100 µm and an aspect ratio of from 5 to 10,000, and an oxide interposed phase. Furthermore, in all of the soft magnetic materials, the flattened magnetic metal particles are oriented with magnetic anisotropy in one direction within aligned flattened surfaces, and thus magnetization proceeds by domain wall displacement. Furthermore, the lattice strain of the flattened magnetic metal particles is from 0.01% to 10%. Furthermore, the lattice spacing within the flattened surfaces of the flattened magnetic metal particles varies with direction, and the proportion of the difference between the maximum lattice spacing and the minimum lattice spacing is from 0.01% to 10%. Furthermore, the surface of the flattened magnetic metal particles is coated with a non-magnetic oxide layer having a thickness of from 0.1 nm to 1 µm. The softening point of the interposed phase is from 200° C. to 600° C.

On the other hand, Comparative Example 8 has no coating layer, and Comparative Example 9 has a coating layer having a thickness as large as 2 µm. Furthermore, Comparative Example 10 has an interposed phase having a softening point of 100° C., and Comparative Example 11 has an interposed phase having a softening point of 700° C.

As is obvious from Table 4, it is understood that the soft magnetic materials related to Examples 15 to 30 are superior to the existing material of Comparative Example 1, in terms of the real part of magnetic permeability, magnetic permeability loss, core loss, the proportion of the change over time in magnetic permeability, and the strength ratio. Also, it is understood that when compared to Comparative Examples 2 to 11, the soft magnetic materials of Examples 15 to 30 are superior particularly in terms of the real part of magnetic permeability, core loss, the proportion of the change over time in magnetic permeability, and the strength ratio.

Thus, it is understood that the soft magnetic materials related to Example 15 to Example 30 are soft magnetic pressed powder materials that satisfy the conditions of high saturation magnetization, high magnetic permeability, low losses, high thermal stability, high oxidation resistance and high strength, and can be applied to complicated shapes.

While certain embodiments have been described, these embodiments have been presented by way of example only, and are not intended to limit the scope of the inventions. Indeed, the soft magnetic material, rotating electric machine, motor and generator described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

The example disclosed in the specification is shown below.

Technological Example 1

A soft magnetic material including:
flattened magnetic metal particles including at least one magnetic metal selected from iron (Fe), cobalt (Co) and nickel (Ni), each of the flattened magnetic metal particles having a thickness of from 10 nm to 100 µm, an aspect ratio of from 5 to 10,000, and a lattice strain of from 0.01% to 10%, and being oriented with magnetic anisotropy in one direction within aligned flattened surface; and
an interposed phase existing between the flattened magnetic metal particles and including at least one of oxygen (O), carbon (C), nitrogen (N) and fluorine (F).

Technological Example 2

The soft magnetic material according to Technological example 1, wherein the magnetization behavior of the flattened magnetic metal particles proceeds by domain wall displacement.

Technological Example 3

The soft magnetic material according to Technological example 1, wherein the magnetization behavior of the flattened magnetic metal particles proceeds by rotation magnetization.

Technological Example 4

The soft magnetic material according to Technological examples 1, 2 or 3, wherein the lattice spacing in the flattened surface of the flattened magnetic metal particles varies with direction, and the proportion of the difference between the maximum lattice spacing and the minimum lattice spacing is from 0.01% to 10%.

Technological Example 5

The soft magnetic material according to Technological examples 1, 2, 3 or 4, wherein the crystallites of the flattened magnetic metal particles are unidirectionally linked in a row within the flattened surface, or the crystallites are rod-shaped and are oriented in one direction within the flattened surface.

Technological Example 6

The soft magnetic material according to Technological examples 1, 2, 3, 4 or 5, wherein the flattened magnetic metal particles include two magnetic metals Fe and Co, and Co is included at a proportion of from 10 atom % to 60 atom % relative to the total amount of Fe and Co.

Technological Example 7

The soft magnetic material according to Technological examples 1, 2, 3, 4, 5 or 6, wherein the flattened surface of the flattened magnetic metal particles is the (110) plane oriented or the (111) plane oriented.

Technological Example 8

The soft magnetic material according to Technological examples 1, 2, 3, 4, 5, 6 or 7, wherein the flattened magnetic metal particles have a crystal structure of a body-centered cubic structure.

Technological Example 9

The soft magnetic material according to Technological examples 1, 2, 3, 4, 5, 6, 7 or 8, wherein the flattened magnetic metal particles have a crystal structure of a mixed phase of a body-centered cubic structure and a face-centered cubic structure.

Technological Example 10

The soft magnetic material according to one of Technological examples 1, 2, 3, 4, 5, 6, 7, 8 or 9, wherein at least a portion of the surface of the flattened magnetic metal particles is covered by a coating layer having a thickness of from 0.1 nm to 1 µm and including at least one of oxygen (O), carbon (C), nitrogen (N) and fluorine (F).

Technological Example 11

The soft magnetic material according to one of Technological examples 1, 2, 3, 4, 5, 6, 7, 8, 9 or 10, wherein the proportion of the lattice mismatch between the interposed phase and the flattened magnetic metal particles is from 0.1% to 50%.

Technological Example 12

The soft magnetic material according to one of Technological examples 1, 2, 3, 4, 5, 6, 7, 8, 9, 10 or 11, wherein the interposed phase has a eutectic system including at least two secondary elements selected from the group consisting of boron (B), silicon (Si), chromium (Cr), molybdenum (Mo), niobium (Nb), lithium (Li), barium (Ba), zinc (Zn), lanthanum (La), phosphorus (P), aluminum (Al), germanium (Ge), tungsten (W), sodium (Na), titanium (Ti), arsenic (As), vanadium (V), calcium (Ca), bismuth (Bi), lead (Pb), tellurium (Te), and tin (Sn), and includes an oxide having a softening point of from 200° C. to 600° C. and a coefficient of thermal expansion of from $0.5 \times 10^{-6}$/° C. to $40 \times 10^{-6}$/C.

Technological Example 13

The soft magnetic material according to Technological example 12, wherein the eutectic system has eutectic particles having a particle size of from 10 nm to 10 µm.

Technological Example 14

The soft magnetic material according to Technological examples 12 or 13, wherein the interposed phase further includes intermediate interposed particles having a softening point higher than the softening point of the eutectic system and including at least one element selected from the group consisting of O (oxygen), C (carbon), N (nitrogen) and F (fluorine).

Technological Example 15

The soft magnetic material according to Technological examples 1, 2, 3, 4, 5, 6, 7, 8, 9, 10 or 11, wherein the interposed phase includes a resin.

Technological Example 16

The soft magnetic material according to Technological examples 1, 2, 3, 4, 5, 6, 7, 8, 9, 10 or 11, wherein the interposed phase includes at least one magnetic metal selected from Fe, Co and Ni.

Technological Example 17

A soft magnetic material including:
a magnetic layer including:
flattened magnetic metal particles including at least one magnetic metal selected from Fe, Co and Ni, the flattened magnetic metal particles having a thickness of from 10 nm to 100 µm, an aspect ratio of from 5 to 10,000, and a lattice strain of from 0.01% to 10%, and being oriented with magnetic anisotropy in one direction within aligned flattened surfaces; and
an interposed phase existing between the flattened magnetic metal particles and including at least one of oxygen (O), carbon (C), nitrogen (N) and fluorine (F), and
an intermediate layer provided in contact with the magnetic layer, the intermediate layer including any one of oxygen (O), carbon (C), nitrogen (N) and fluorine (F) and having a magnetic permeability smaller than the magnetic permeability of the magnetic layer.

Technological Example 18

A rotating electric machine including the soft magnetic material according to Technological examples 1, 2, 3, 4, 5, 6, 7, 8, 9, 10, 11, 12, 13, 14, 15, 16 or 17.

Technological Example 19

A motor including the soft magnetic material according to Technological examples 1, 2, 3, 4, 5, 6, 7, 8, 9, 10, 11, 12, 13, 14, 15, 16 or 17.

Technological Example 20

A generator including the soft magnetic material according to Technological examples 1, 2, 3, 4, 5, 6, 7, 8, 9, 10, 11, 12, 13, 14, 15, 16 or 17.

What is claimed is:

1. A soft magnetic material comprising:
flattened magnetic metal particles including at least one magnetic metal selected from iron (Fe), cobalt (Co) and nickel (Ni), each of the flattened magnetic metal particles having a thickness of from 10 nm to 100 µm, an aspect ratio $[(a+b)/2]/t$ of from 5 to 10,000, and a lattice strain of from 0.01% to 10%, and being oriented with magnetic anisotropy in one direction within aligned flattened surface; and
an interposed phase existing between the flattened magnetic metal particles and including at least one of oxygen (O), carbon (C), nitrogen (N) and fluorine (F),
wherein in $[(a+b)/2]/t$, b is the minimum length in the flattened surface, a is the maximum length in the flattened surface, and t is the thickness of the flattened magnetic metal particle.

2. The soft magnetic material according to claim 1, wherein the magnetization behavior of the flattened magnetic metal particles proceeds by domain wall displacement.

3. The soft magnetic material according to claim 1, wherein the magnetization behavior of the flattened magnetic metal particles proceeds by rotation magnetization.

4. The soft magnetic material according to claim 1, wherein the lattice spacing in the flattened surface of the flattened magnetic metal particles varies with direction, and the proportion of the difference between the maximum lattice spacing and the minimum lattice spacing is from 0.01% to 10%.

5. The soft magnetic material according to claim 1, wherein the crystallites of the flattened magnetic metal particles are unidirectionally linked in a row within the flattened surface, or the crystallites are rod-shaped and are oriented in one direction within the flattened surface.

6. The soft magnetic material according to claim 1, wherein the flattened magnetic metal particles include two magnetic metals Fe and Co, and Co is included at a proportion of from 10 atom % to 60 atom % relative to the total amount of Fe and Co.

7. The soft magnetic material according to claim 1, wherein the flattened surface of the flattened magnetic metal particles is the (110) plane oriented or the (111) plane oriented.

8. The soft magnetic material according to claim 1, wherein the flattened magnetic metal particles have a crystal structure of a body-centered cubic structure.

9. The soft magnetic material according to claim 1, wherein the flattened magnetic metal particles have a crystal structure of a mixed phase of a body-centered cubic structure and a face-centered cubic structure.

10. The soft magnetic material according to claim 1, wherein at least a portion of the surface of the flattened magnetic metal particles is covered by a coating layer having a thickness of from 0.1 nm to 1 μm and including at least one of oxygen (O), carbon (C), nitrogen (N) and fluorine (F).

11. The soft magnetic material according to claim 1, wherein the proportion of the lattice mismatch between the interposed phase and the flattened magnetic metal particles is from 0.1% to 50%.

12. The soft magnetic material according to claim 1, wherein the interposed phase has a eutectic system including at least two secondary elements selected from the group consisting of boron (B), silicon (Si), chromium (Cr), molybdenum (Mo), niobium (Nb), lithium (Li), barium (Ba), zinc (Zn), lanthanum (La), phosphorus (P), aluminum (Al), germanium (Ge), tungsten (W), sodium (Na), titanium (Ti), arsenic (As), vanadium (V), calcium (Ca), bismuth (Bi), lead (Pb), tellurium (Te), and tin (Sn), and includes an oxide having a softening point of from 200° C. to 600° C. and a coefficient of thermal expansion of from $0.5 \times 10^{-6}$/° C. to $40 \times 10^{-6}$/° C.

13. The soft magnetic material according to claim 12, wherein the eutectic system has eutectic particles having a particle size of from 10 nm to 10 μm.

14. The soft magnetic material according to claim 12, wherein the interposed phase further includes intermediate interposed particles having a softening point higher than the softening point of the eutectic system and including at least one element selected from the group consisting of O (oxygen), C (carbon), N (nitrogen) and F (fluorine).

15. The soft magnetic material according to claim 1, wherein the interposed phase includes a resin.

16. The soft magnetic material according to claim 1, wherein the interposed phase includes at least one magnetic metal selected from Fe, Co and Ni.

17. A soft magnetic material comprising:
a magnetic layer including:
flattened magnetic metal particles including at least one magnetic metal selected from Fe, Co and Ni, the flattened magnetic metal particles having a thickness of from 10 nm to 100 μm, an aspect ratio [(a+b)/2]/t of from 5 to 10,000, and a lattice strain of from 0.01% to 10%, and being oriented with magnetic anisotropy in one direction within aligned flattened surfaces; and
an interposed phase existing between the flattened magnetic metal particles and including at least one of oxygen (O), carbon (C), nitrogen (N) and fluorine (F), and
an intermediate layer provided in contact with the magnetic layer, the intermediate layer including any one of oxygen (O), carbon (C), nitrogen (N) and fluorine (F) and having a magnetic permeability smaller than the magnetic permeability of the magnetic layer,
wherein in [(a+b)/2]/t, b is the minimum length in the flattened surface, a is the maximum length in the flattened surface, and t is the thickness of the flattened magnetic metal particle.

18. A rotating electric machine including the soft magnetic material according to claim 1.

19. A motor including the soft magnetic material according to claim 1.

20. A generator including the soft magnetic material according to claim 1.

* * * * *